(12) United States Patent
Espinoza

(10) Patent No.: US 12,442,474 B2
(45) Date of Patent: Oct. 14, 2025

(54) ERGONOMIC IRRIGATION FITTINGS

(71) Applicant: Husqvarna AB, Huskvarna (SE)

(72) Inventor: Ulises Harin Espinoza, Taylorsville, UT (US)

(73) Assignee: HUSQVARNA AB (SE)

( * ) Notice: Subject to any disclaimer, the term of this patent is extended or adjusted under 35 U.S.C. 154(b) by 133 days.

(21) Appl. No.: 18/215,687

(22) Filed: Jun. 28, 2023

(65) Prior Publication Data

US 2025/0003539 A1    Jan. 2, 2025

(51) Int. Cl.
| | |
|---|---|
| *F16L 41/03* | (2006.01) |
| *F16L 33/32* | (2006.01) |
| *F16L 41/02* | (2006.01) |
| *F16L 43/02* | (2006.01) |

(52) U.S. Cl.
CPC ............. *F16L 33/32* (2013.01); *F16L 41/021* (2013.01); *F16L 41/03* (2013.01); *F16L 43/02* (2013.01)

(58) Field of Classification Search
CPC ......... F16L 47/32; F16L 41/02; F16L 41/021; F16L 41/023; F16L 41/03
See application file for complete search history.

(56) References Cited

U.S. PATENT DOCUMENTS

| | | | |
|---|---|---|---|
| D197,756 S | 3/1964 | Myers | |
| 3,538,940 A * | 11/1970 | Graham | F16L 41/03 285/305 |
| D251,734 S * | 5/1979 | McCaw | D24/129 |
| D259,278 S | 5/1981 | McCaw | |
| D321,240 S | 10/1991 | Clivio | |
| 5,573,280 A * | 11/1996 | Salter | F16L 47/32 285/305 |
| D471,261 S | 3/2003 | Kozu | |
| 6,543,138 B1 | 4/2003 | Berry | |
| D554,238 S | 10/2007 | Zielke | |
| 8,898,876 B2 * | 12/2014 | Feith | F16L 47/32 29/270 |
| 9,668,431 B2 | 6/2017 | Turk et al. | |
| D803,993 S | 11/2017 | Mccollum | |
| 10,537,073 B2 | 1/2020 | Turk et al. | |

(Continued)

FOREIGN PATENT DOCUMENTS

| | | |
|---|---|---|
| CN | 201209737 U | 3/2009 |
| CN | 206889936 U | 1/2018 |

(Continued)

OTHER PUBLICATIONS

U.S. Appl. No. 29,896,035, filed Jun. 28, 2023, Espinoza.

(Continued)

*Primary Examiner* — Matthew Troutman
*Assistant Examiner* — Fannie Kee
(74) *Attorney, Agent, or Firm* — Austin Rapp

(57) ABSTRACT

An irrigation fitting comprises a first fitting branch and a second fitting branch. The first fitting branch comprises a first planar region and a second planar region. The second fitting branch comprises a third planar region and a fourth planar region. The first planar region and the third planar region jointly comprise a first curved concave edge and a second curved concave edge. The second planar region and the fourth planar region jointly comprise a third curved concave edge and a fourth curved concave edge.

14 Claims, 14 Drawing Sheets

(56) References Cited

U.S. PATENT DOCUMENTS

| | | | |
|---|---|---|---|
| D973,198 S | 12/2022 | Bittigkoffer | |
| D984,637 S | 4/2023 | Yu | |
| D985,738 S | 5/2023 | Tropper | |
| D1,023,076 S | 4/2024 | Sundheim | |
| 2007/0007761 A1* | 1/2007 | Nisel | F16L 47/32 |
| | | | 285/133.11 |
| 2011/0016682 A1 | 1/2011 | Wood, III | |
| 2022/0260191 A1 | 8/2022 | Lapierre et al. | |
| 2023/0113830 A1 | 4/2023 | Ensworth et al. | |

FOREIGN PATENT DOCUMENTS

| | | | | |
|---|---|---|---|---|
| CN | 206895407 U | | 1/2018 | |
| CN | 208859179 U | | 5/2019 | |
| CN | 212028847 U | | 11/2020 | |
| CN | 212573535 U | | 2/2021 | |
| DE | 2718732 A1 | | 11/1978 | |
| DE | 202008013639 U1 | * | 4/2010 | F16L 47/32 |
| EP | 3404307 A1 | * | 11/2018 | F16L 47/32 |
| EP | 3591268 A1 | * | 1/2020 | F16L 41/021 |
| KR | 20160076598 A | * | 7/2016 | F16L 47/32 |
| WO | WO-2010108820 A1 | * | 9/2010 | F16L 47/32 |

OTHER PUBLICATIONS

Orbit Irrigation Products, LLC, "1/4 Barb Fittings Assortment Pack—30 count" Part No. 67431, web archive [online brochure], apparently published on or before May 29, 2022 [retrieved from the Internet on Sep. 19, 2023 from: <URL: https://web.archive.org/web/20220529044703/https://www.orbitonline.com/products/1-4-in-barb-fittings-assortment-pack-30-bag>] (shown in attachment 1).

Notice of Allowance and Fee(s) Due (including a Notice of Allowability for a Design Application section, and a Response to Amendments section) for U.S. Appl. No. 29/896,035, Mailed on May 19, 2025 (shown in attachment 1).

Gardrip 1/4 Inch Drip Irrigation Fittings Kit. By Anpowvip. Dated Dec. 6, 2022. Found online [Feb. 26, 2025] https://www.amazon.com/Gardrip-Irrigation-Connectors-Sprinkler-Couplings/dp/B0BP7GCBVX (Year: 2022) (shown in attachment 1).

Ex parte Quayle Action, U.S. Appl. No. 29/896,035, mailed Mar. 13, 2025 (shown in attachment 2).

Ex parte Quayle Action Response, U.S. Appl. No. 29/896,035, dated May 5, 2025 (shown in attachment 3).

Examiner Interview Summary Record, U.S. Appl. No. 29/896,035, dated May 5, 2025 (shown in attachment 4).

* cited by examiner

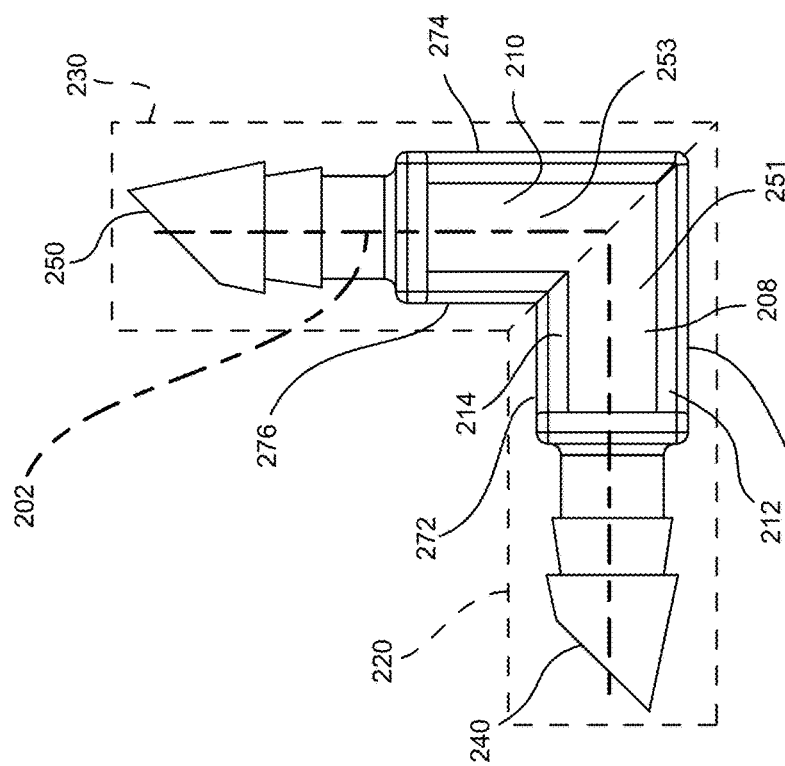
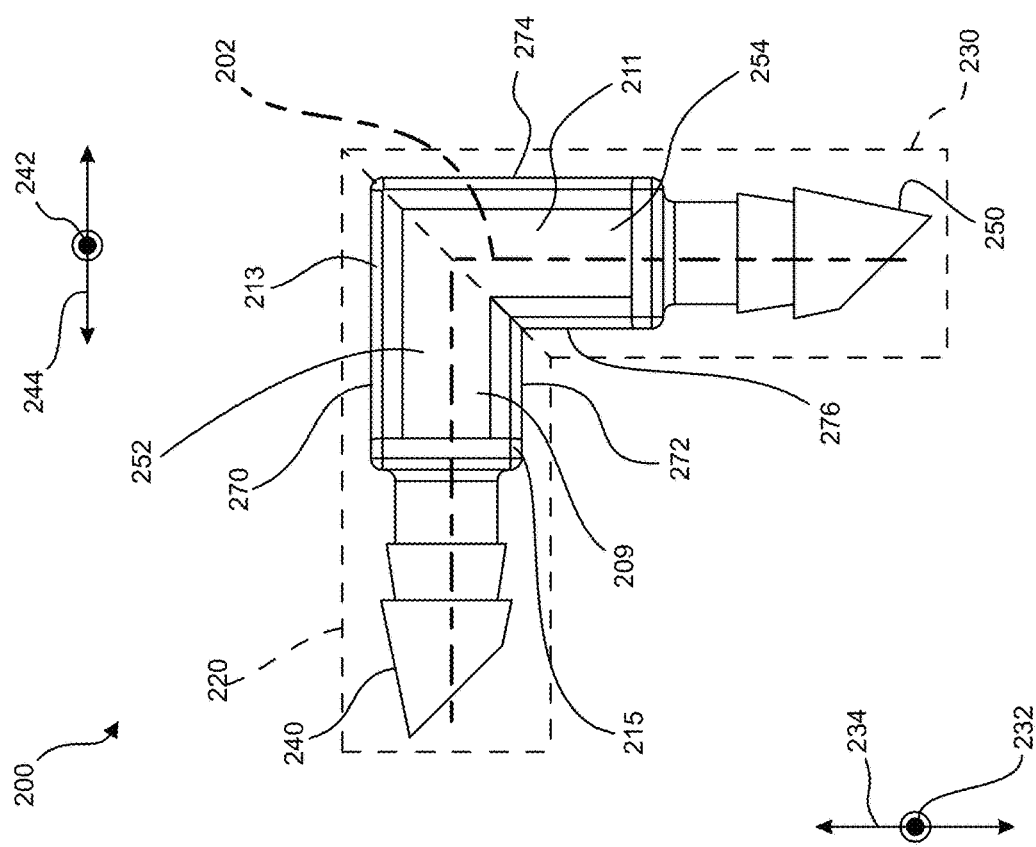
FIG. 6A
FIG. 6B

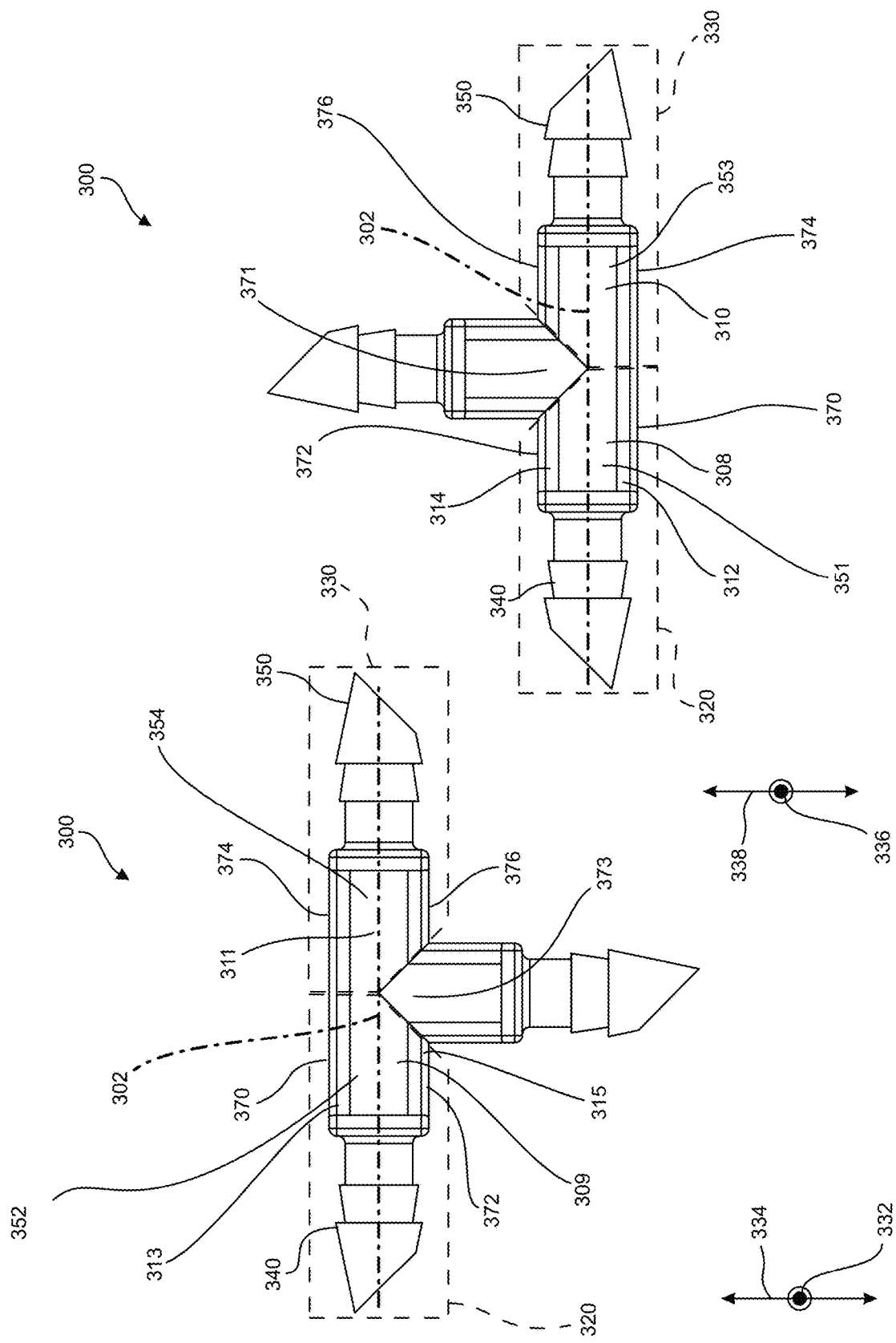

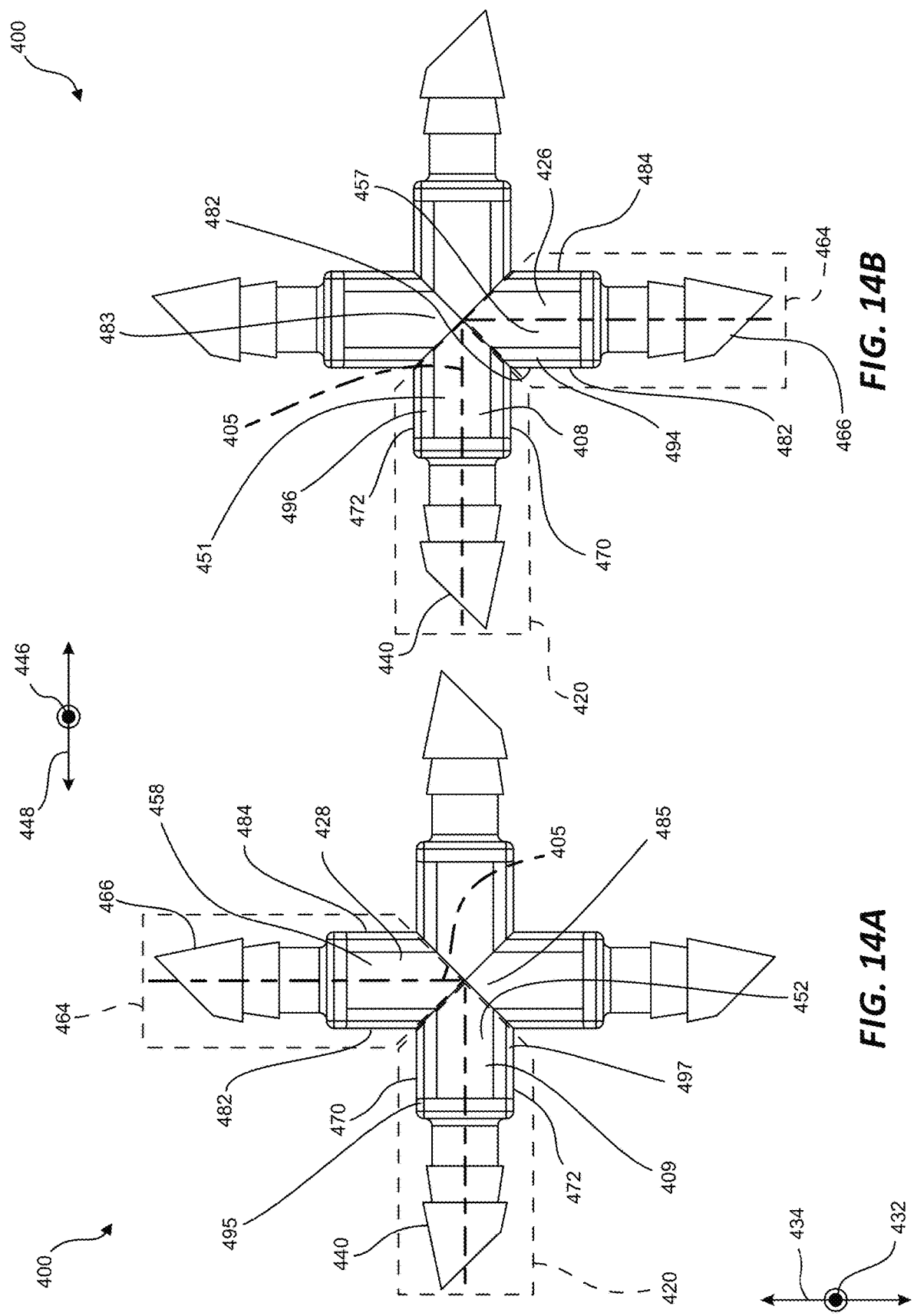

ERGONOMIC IRRIGATION FITTINGS

TECHNICAL FIELD

The present invention relates generally to a watering/ irrigation component. More specifically, the present invention relates to ergonomic irrigation fittings.

BACKGROUND

Irrigation fittings are often difficult to insert and remove from irrigation tubes, particularly in connection with drip irrigation systems. Therefore, providing ergonomic fittings would be advantageous to facilitate gripping the fittings for the purposes of insertion and removal of the fittings. As a consequence, it would be advantageous to incorporate ergonomic features into the fittings.

SUMMARY

Embodiments of the disclosed subject matter are provided in this summary for illustrative purposes and are in no way limiting of the claimed subject matter. Various sets of embodiments are disclosed in the summary. Those skilled in the art will appreciate that one or more aspects of one set of embodiments may be incorporated into and utilized with other embodiments disclosed in the summary and detailed description.

An irrigation fitting is disclosed. The irrigation fitting may comprise a first fitting branch and a second fitting branch. The first fitting branch may comprise a first planar region, a second planar region, a first recessed region, a second recessed region, a first barbed member, a first branch lateral dimension and a first branch transverse dimension. The first planar region may be disposed opposite the second planar region on the first fitting branch along the first branch lateral dimension. The first recessed region may be disposed opposite the second recessed region on the first fitting branch along the first branch transverse dimension.

The second fitting branch may comprise a third planar region, a fourth planar region, a third recessed region, a fourth recessed region, a second barbed member, a second branch lateral dimension and a second branch transverse dimension. The third planar region may be disposed opposite the fourth planar region on the second fitting branch along the second branch lateral dimension. The third recessed region may be disposed opposite the fourth recessed region on the second fitting branch along the second branch transverse dimension.

The first planar region and the third planar region may jointly comprise a first curved concave edge and a second curved concave edge.

The second planar region and the fourth planar region may jointly comprise a third curved concave edge and a fourth curved concave edge.

The first fitting branch and the second fitting branch may define a linear fluid flow pathway.

Alternatively, a first fitting branch and the second fitting branch may define a non-linear fluid flow pathway.

The first branch lateral dimension may be generally perpendicular to the first branch transverse dimension.

The first branch lateral dimension and the first branch transverse dimension may both be generally perpendicular to a portion of a fluid flow pathway through the first fitting branch.

The second branch lateral dimension may be generally perpendicular to the second branch transverse dimension.

The second branch lateral dimension and the second branch transverse dimension may both be generally perpendicular to a portion of a fluid flow pathway through the second fitting branch.

In various embodiments, each of the first recessed region, the second recessed region, the third recessed region, and the fourth recessed region may comprise a cylindrical protrusion.

In various embodiments, each of the first barbed member and the second barbed member may comprise at least two frustoconical protrusions.

In various embodiments, at least one of the first curved concave edge, the second curved concave edge, the third curved concave edge and the fourth curved concave edge comprise a discontinuous region.

The irrigation fitting may further comprise a third fitting branch. The third fitting branch may comprise a fifth planar region, a sixth planar region, a fifth recessed region, a sixth recessed region, a third barbed member, a third branch lateral dimension and a third branch transverse dimension. The fifth planar region may be disposed opposite the sixth planar region on the third fitting branch along the third branch lateral dimension. The fifth recessed region may be disposed opposite the sixth recessed region on the third fitting branch along the third branch transverse dimension.

The first planar region and the fifth planar region may jointly comprise a fifth curved concave edge and a sixth curved concave edge.

The second planar region and the sixth planar region may jointly comprise a seventh curved concave edge and an eighth curved concave edge.

The irrigation fitting may further comprise a fourth fitting branch. The fourth fitting branch may comprise a seventh planar region, an eighth planar region, a seventh recessed region, an eighth recessed region, a fourth barbed member, a fourth branch lateral dimension and a fourth branch transverse dimension. The seventh planar region may be disposed opposite the eighth planar region on the fourth fitting branch along the fourth branch lateral dimension. The seventh recessed region may be disposed opposite the eighth recessed region on the fourth fitting branch along the fourth branch transverse dimension. The first planar region and the seventh planar region may jointly comprise a ninth curved concave edge and a tenth curved concave edge.

The second planar region and the eighth planar region may jointly comprise an eleventh curved concave edge and a twelfth curved concave edge.

In various embodiments, each of the fifth recessed region, the sixth recessed region, the seventh recessed region, and the eighth recessed region comprise a cylindrical protrusion.

In various embodiments, each of the third barbed member and the fourth barbed member comprise at least two frustoconical protrusions.

In various embodiments, at least one of the fifth curved concave edge, the sixth curved concave edge, the tenth curved concave edge and the twelfth curved concave edge may comprise a discontinuous region.

BRIEF DESCRIPTION OF THE DRAWINGS

Illustrative embodiments of the invention will become more fully apparent from the following description and appended claims, taken in conjunction with the accompanying drawings. Understanding that these drawings depict only illustrative embodiments and are, therefore, not to be considered limiting of the invention's scope, the illustrative embodiments of the invention will be described with additional specificity and detail through use of the accompanying drawings in which:

FIG. 6A is a top view of the second embodiment of the irrigation fitting illustrating a first fluid flow pathway through the second embodiment;

FIG. 6B is a bottom view of the second embodiment of the irrigation fitting illustrating a first fluid flow pathway through the second embodiment;

FIG. 8A is a top view of the third embodiment of the irrigation fitting, illustrating a first fluid flow pathway through the third embodiment;

FIG. 8B is a bottom view of the third embodiment of the irrigation fitting, illustrating the first fluid flow pathway through the third embodiment;

FIG. 14A is a top view of the fourth embodiment of the irrigation fitting, illustrating a third fluid flow pathway through the fourth embodiment; and FIG. 14B is a bottom view of the fourth embodiment of the irrigation fitting, illustrating the third fluid flow pathway through the fourth embodiment.

DETAILED DESCRIPTION

Figure 1:
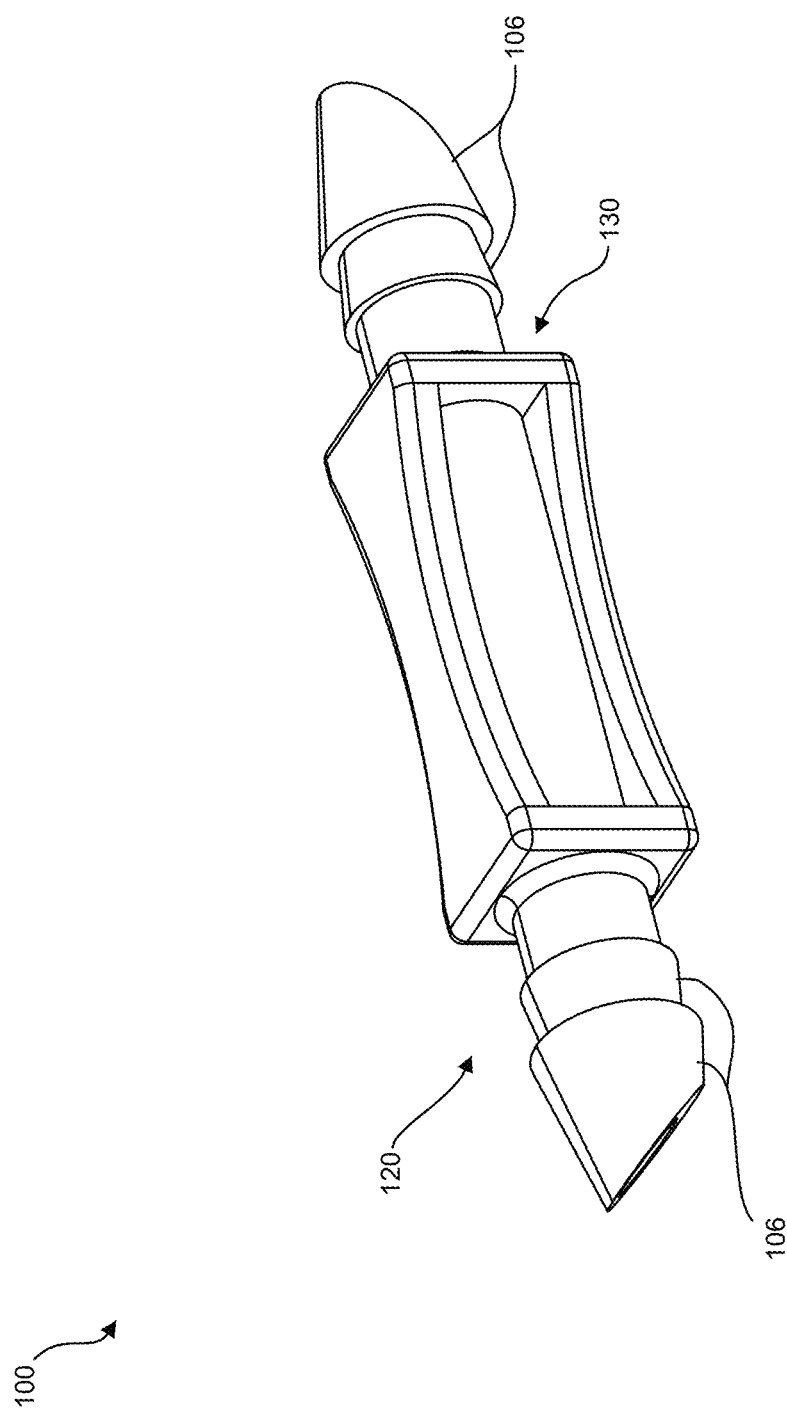
FIG. 1 is a perspective view of a first embodiment of an irrigation fitting.
Figure 2:
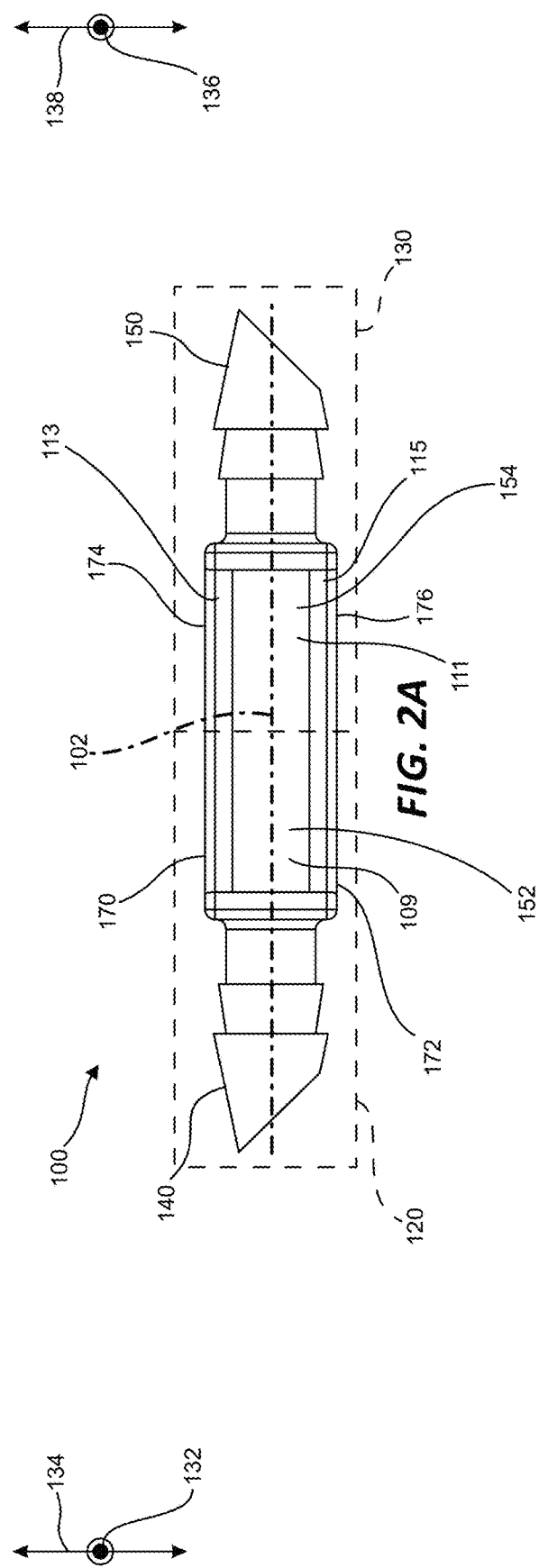
FIG. 2A is a top view of the first embodiment of the irrigation fitting illustrating a first fluid flow pathway through the first embodiment.
FIG. 2B is a bottom view of the first embodiment of the irrigation fitting illustrating a first fluid flow pathway through the first embodiment.
Figure 3:
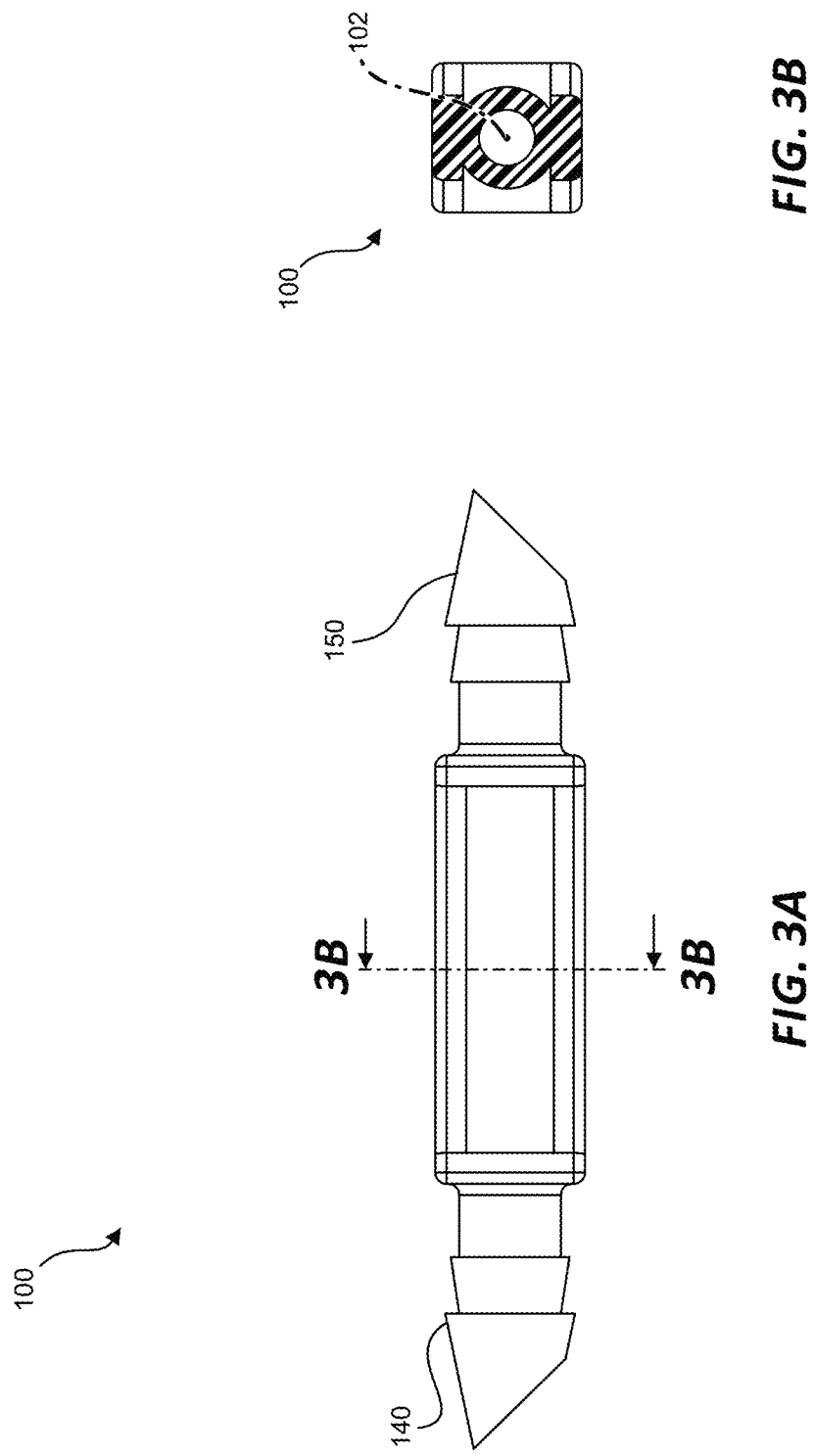
FIG. 3A is a top view of the first embodiment of the irrigation fitting.
FIG. 3B is a cross-sectional view of the first embodiment of the irrigation fitting taken across the line 3B-3B from FIG. 3A.

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures or identified in the description. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

General Definitions

By way of introduction, the following brief definitions are provided for various terms that may be used in this application. Additional definitions may be provided in the context of the discussion of the figures herein. As used herein, "exemplary" can indicate an example, an implementation, and/or an aspect of the disclosed subject matter and does not signify a preferred implementation.

Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") when used to modify an element (such as a structure, a component, an operation, etc.) does not indicate priority or order of the element with respect to another element, but rather distinguishes the element from another element having a same name (but for use of the ordinal term) unless otherwise expressly indicated.

In addition, as used herein, indefinite articles ("a" and "an") can indicate "one or more" rather than "one."

As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited.

As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter.

An enumerated listing of items recited in connection with an embodiment of the invention does not imply that any or all of the items are mutually exclusive and/or mutually inclusive of one another unless expressly specified otherwise.

Within this application, the phrases "secured to," "connected to," "coupled to," and "in communication with" refer to any form of interaction between two or more entities, including mechanical, electrical, magnetic, electromagnetic, and thermal interaction and may also include fluid communication. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abut" refers to items that are in direct physical contact with each other, although the items may be attached, secured, fused, or welded together.

The term "integrally formed" refers to items that are manufactured integrally, i.e., as a single piece, without requiring the assembly of multiple pieces. Multiple parts may be integrally formed with each other if they are formed from a single workpiece. The term "separately manufactured" signifies that two identified items are not integrally formed (e.g., either by different manufacturing processes, or by the same manufacturing process at different times and/or locations).

As used herein, the term "substantially coaxially aligned" signifies that two items are aligned such that the items share a common, imaginary axis (or are within 15° of sharing the same common, imaginary axis) extending through both of the items, although the items may be spaced apart along that common, imaginary axis.

In various embodiments, the term "offset and substantially coaxially aligned" signifies that two items are aligned such that they share a common, imaginary axis (or are within 15° of sharing the same common, imaginary axis) extending through both of the items and the center points of the items along the common, imaginary axis are spaced apart along the common, imaginary axis.

In various embodiments, "overlapping and substantially coaxially aligned" signifies that two items are aligned such that they share a common, imaginary axis (or are within 15° of sharing the same common, imaginary axis) extending through both of the items and the items overlap along the common, imaginary axis.

In various embodiments, "coextensive and substantially coaxially aligned" signifies that two items are aligned such that they share a common, imaginary axis (or are within 15° of sharing the same common, imaginary axis) extending through both of the items and the items are coextensive along the common, imaginary axis.

As used herein, the term "substantially" indicates that a particular value is within 15% of a specified value. For example, the phrase "substantially parallel," as used herein, signifies that the pertinent members, components, or items that are "substantially parallel" to each other are within 15° of being perfectly parallel to each other.

As used herein, in various embodiments, the term "center point nonalignment" when used to identify a relative position of items, features or components along a designated axis signifies that the center points of each of the two identified items are not aligned along a designated axis.

In various embodiments, the term "outer boundary nonalignment" may be used to signify that the outer boundaries of two items do not overlap along a designated axis. The term "nonaligned positions" indicates that two items are not aligned along at least one axis and may refer, for example, to either center point nonalignment or outer boundary nonalignment.

As used herein the term "generally perpendicular" signifies that two items are within 15° of being precisely perpendicular. As used herein, the term "generally parallel" signifies that two items are within 15° of persons being precisely parallel.

Different embodiments disclosed herein will be assigned reference numerals chosen from groups of one hundred. For example, a first embodiment may include numbers within the range 100-199, and a second embodiment may include numbers within the range 200-299. Similar parts in the different embodiments include analogous numbers. For example, a component in a first embodiment may be assigned reference numeral 121, while a similar component in the second embodiment may be assigned reference numeral 221.

In the figures, certain components may appear many times within a particular drawing. However, only certain instances of the components may be identified in the figures to avoid the undue proliferation of reference numbers and lead lines. According to the context provided in the description while referring to the figures, reference may be made to a specific one of that particular component or multiple instances, even if the specifically referenced instance or instances of the component are not identified by a reference number and lead line in the figures.

The figures will be discussed in the groups outlined below unless otherwise noted. To avoid the undue proliferation of reference numerals and part names, a particular part name and reference numeral will be included at least once in each group but may not appear in all figures within the group. In addition, once a reference numeral and part number has been introduced within a particular group of figures, it may be discussed in subsequent groups of figures although not identified within the currently discussed group of figures.

Introduction

Figure 4:
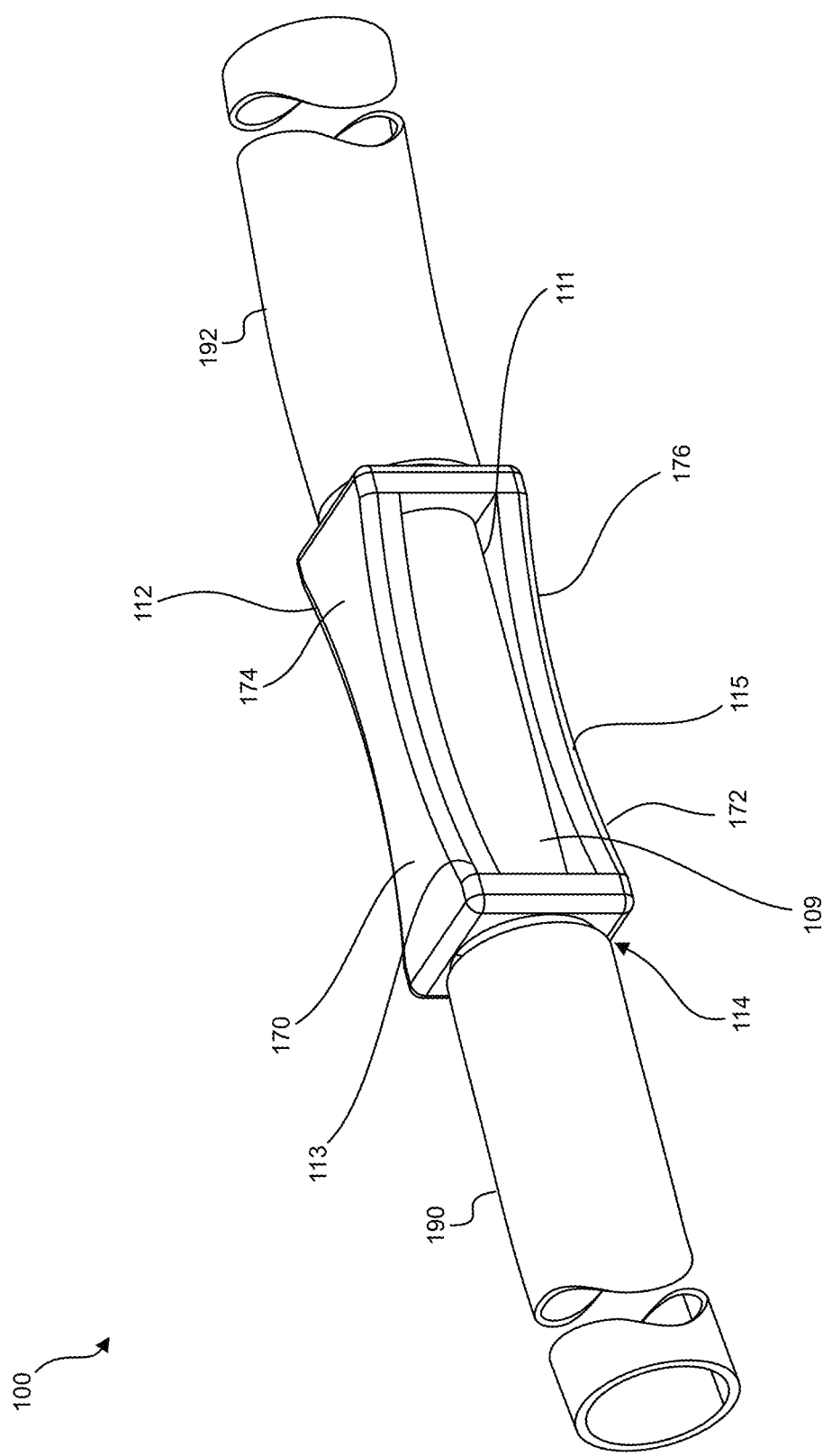
FIG. 4 is a perspective view of the first embodiment of the irrigation fitting coupled to a first tube and a second tube.
Figure 5:
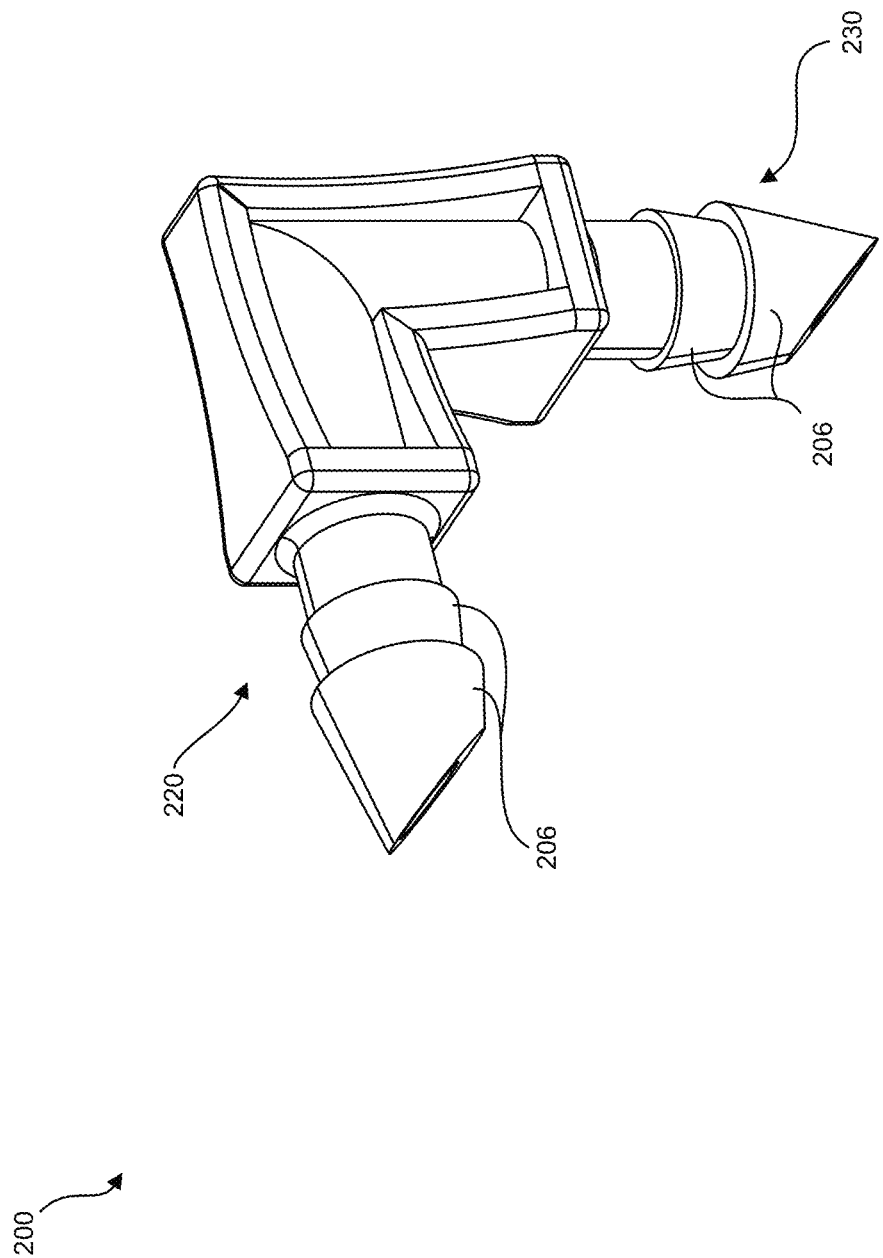
FIG. 5 is a perspective view of a second embodiment of an irrigation fitting.
Figure 7:
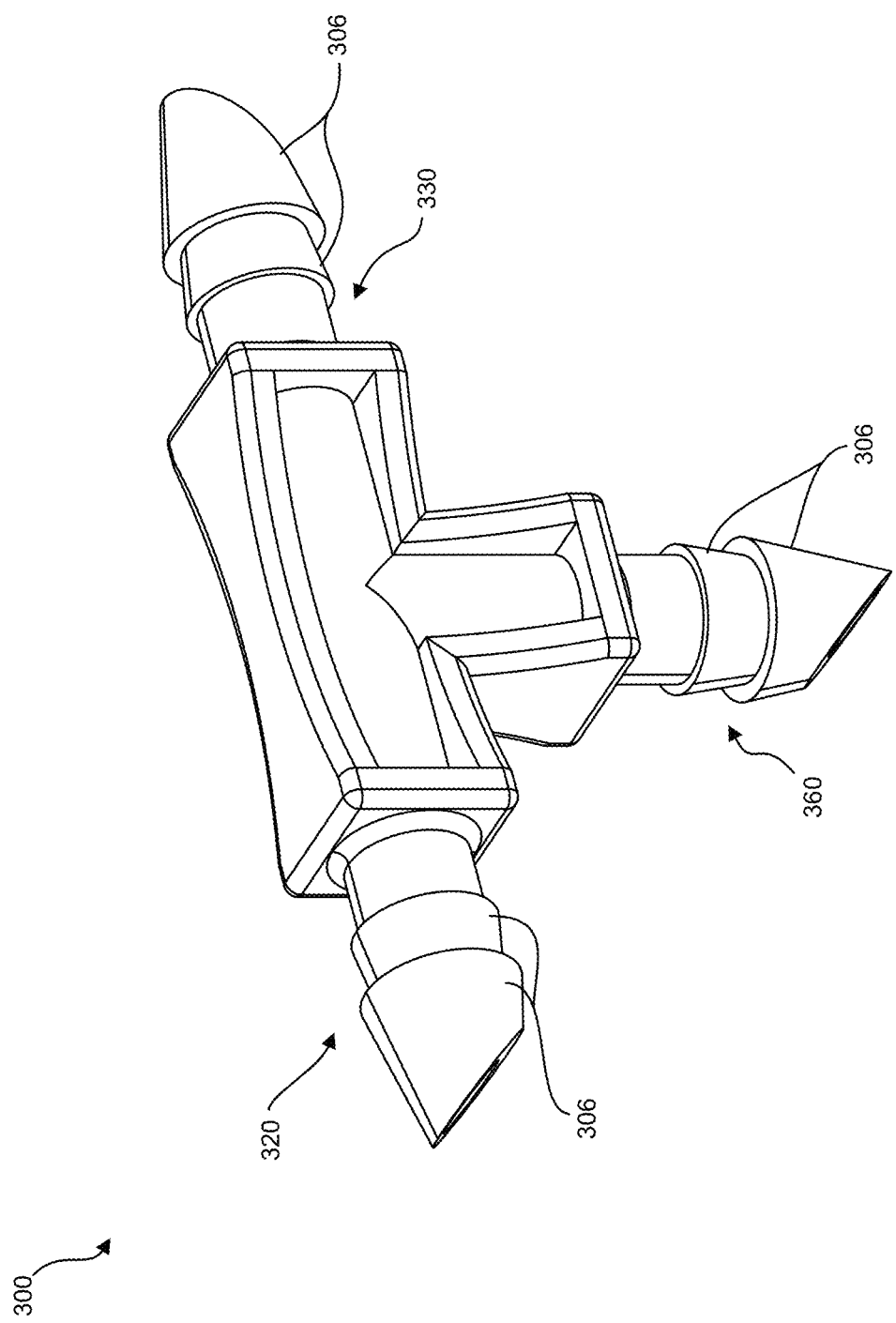
FIG. 7 is a perspective view of a third embodiment of the irrigation fitting.

FIGS. 1-4 illustrate a first embodiment of an irrigation fitting 100, which has a linear shape; FIGS. 5-6B illustrate a second embodiment of an irrigation fitting 200, which has an L-shape; FIGS. 7-9B illustrate a third embodiment of an irrigation fitting 300, which has a T-shape; FIGS. 10-12B illustrate a fourth embodiment of the irrigation fitting 400, which has a cross-shape. Each of these embodiments include a plurality of curved concave edges that facilitate gripping and manipulation of each fitting, for example, during the insertion and removal process. In addition, recessed regions may be disposed between the curved concave edges to further facilitate the gripping process. The recessed regions may comprise cylindrical protrusions as well, which further facilitates gripping of the fittings.

FIGS. 1-4

The first embodiment of the irrigation fitting 100 comprises only a single fluid flow pathway, a first fluid flow pathway 102. It should be noted that fluid (e.g., water or water including additives, such as fertilizers or pesticides) could flow in either direction through the first fluid flow pathway 102. The illustrated first fluid flow pathway 102 is linear. The first embodiment of the irrigation fitting 100 includes a first fitting branch 120 and a second fitting branch 130. As illustrated, the first fitting branch 120 is a mirror image of the second fitting branch 130. Each fitting branch 120, 130 includes a lateral dimension 134, 138 and a transverse dimension 132, 136.

The first fitting branch 120 may comprise a first planar region 170, a second planar region 172, a first recessed region 108, a second recessed region 109, a first barbed member 140, a first branch lateral dimension 134 and a first branch transverse dimension 132. The first planar region 170 may be disposed opposite the second planar region 172 on the first fitting branch 120 along the first branch lateral dimension 134. The first recessed region 108 may be disposed opposite the second recessed region 109 on the first fitting branch 120 along the first branch transverse dimension 132.

The second fitting branch 130 may comprise a third planar region 174, a fourth planar region 176, a third recessed region 110, a fourth recessed region 111, a second barbed member 150, a second branch lateral dimension 138 and a second branch transverse dimension 136. The third planar region 174 may be disposed opposite the fourth planar region 176 on the second fitting branch 130 along the second branch lateral dimension 138. The third recessed region 110 may be disposed opposite the fourth recessed region 111 on the second fitting branch 130 along the second branch transverse dimension 136.

The first planar region 170 and the third planar region 174 jointly comprise a first curved concave edge 112 and a second curved concave edge 113. The first curved concave edge 112 may be disposed opposite the second curved concave edge 113 along both the first branch transverse dimension 132 and the second branch transverse dimension 136. The second planar region 172 and the fourth planar region 176 jointly comprise a third curved concave edge 114 and a fourth curved concave edge 115. The third curved concave edge 114 may be disposed opposite the fourth curved concave edge 115 along both the first branch transverse dimension 132 and the second branch transverse dimension 136.

The first recessed region 108 and the second recessed region 109 may be disposed intermediate the first planar region 170 and the second planar region 172 along the first branch lateral dimension 134. The third recessed region 110 and the fourth recessed region 111 may be disposed intermediate the third planar region 174 and the fourth planar region 176 along the second branch lateral dimension 138.

The second recessed region 109 and the fourth recessed region 111 may be disposed intermediate the second curved concave edge 113 and the fourth curved concave edge 115 along both the first branch lateral dimension 134 and the second branch lateral dimension 138. The first recessed region 108 and the third recessed region 110 may be disposed intermediate the third curved concave edge 114 and the first curved concave edge 112 along both the first branch lateral dimension 134 and the second branch lateral dimension 138.

The first recessed region 108 may comprise a first cylindrical protrusion 151; the second recessed region 109 may comprise a second cylindrical protrusion 152; the third recessed region 110 may comprise a third cylindrical protrusion 153; and a fourth recessed region 111 may comprise a fourth cylindrical protrusion 154.

Each of the first barbed member 140 and the second barbed member 150 may, in various embodiments, comprise at least two frustoconical protrusions 106. With reference specifically to FIG. 4, the first barbed member 140 may be coupled to and disposed within a first tube 190, while the second barbed member 150 may be coupled to and disposed within a second tube 192.

As noted previously, the first curved concave edge 112, the second curved concave edge 113, the third curved concave edge 114, and the fourth curved concave edge 115 together with the recessed regions 108, 109, 110, 111 and cylindrical protrusions 151, 152, 153, 154 provide an ergonomic interface that allow for easy gripping of the fitting 100, which is particularly useful during the insertion or withdrawal process of a fitting 100.

As illustrated, the first branch lateral dimension 134 may be precisely perpendicular or generally perpendicular to the first branch transverse dimension 132. In addition, the first branch lateral dimension 134 and the first branch transverse dimension 132 may both be precisely perpendicular or generally perpendicular to a portion of the fluid flow pathway 102 extending through the first fitting branch 120. The second branch lateral dimension 138 may be precisely perpendicular or generally perpendicular to the second branch transverse dimension 136. In addition, the second branch lateral dimension 138 and the second branch transverse dimension 136 may both be precisely perpendicular or generally perpendicular to a portion of the fluid flow pathway 102 extending through the second fitting branch 130.

In addition, the first branch lateral dimension 134 and the second branch lateral dimension 138 may be precisely parallel or generally parallel. Likewise, the first branch transverse dimension 132 and the second branch transverse dimension 136 may be precisely parallel or generally parallel.

FIGS. 5-6B

The second embodiment of the irrigation fitting 200 comprises only a single fluid flow pathway, a first fluid flow pathway 202. As noted, fluid (e.g., water or water including additives, such as fertilizers or pesticides) could flow in either direction through the first fluid flow pathway 202. The illustrated first fluid flow pathway 202 is non-linear and involves a 90° turn. The second embodiment of the irrigation fitting 200 includes a first fitting branch 220 and a second fitting branch 230. As illustrated, the first fitting branch 220 is a mirror image of the second fitting branch 230. Each fitting branch 220, 230 includes a lateral dimension 234, 244 and a transverse dimension 232, 242.

The first fitting branch 220 may comprise a first planar region 270, a second planar region 272, a first recessed region 208, a second recessed region 209, a first barbed member 240, a first branch lateral dimension 234 and a first branch transverse dimension 232. The first planar region 270 may be disposed opposite the second planar region 272 on the first fitting branch 220 along the first branch lateral dimension 234. The first recessed region 208 may be disposed opposite the second recessed region 209 on the first fitting branch 220 along the first branch transverse dimension 232.

The second fitting branch 230 may comprise a third planar region 274, a fourth planar region 276, a third recessed region 210, a fourth recessed region 211, a second barbed member 250, a second branch lateral dimension 244 and a second branch transverse dimension 242. The third planar region 274 may be disposed opposite the fourth planar region 276 on the second fitting branch 230 along the second branch lateral dimension 244. The third recessed region 210 may be disposed opposite the fourth recessed region 211 on the second fitting branch 230 along the second branch transverse dimension 242.

The first planar region 270 and the third planar region 274 jointly comprise a first curved concave edge 212 and a second curved concave edge 213. The second planar region 272 and the fourth planar region 276 jointly comprise a third curved concave edge 214 and a fourth curved concave edge 215.

The first recessed region 208 and the second recessed region 209 may be disposed intermediate the first planar region 270 and the second planar region 272 along the first branch lateral dimension 234. The third recessed region 210 and the fourth recessed region 211 may be disposed intermediate the third planar region 274 and the fourth planar region 276 along the second branch lateral dimension 244.

The second recessed region 209 and the fourth recessed region 211 may be disposed intermediate the second curved concave edge 213 and the fourth curved concave edge 215, from the perspective of the top view as illustrated in FIG. 6A. The first recessed region 208 and the third recessed region 210 may be disposed intermediate the third curved concave edge 214 and the first curved concave edge 212, from the perspective of the bottom view as illustrated in FIG. 6B.

The first recessed region 208 may comprise a first cylindrical protrusion 251; the second recessed region 209 may comprise a second cylindrical protrusion 252; the third recessed region 210 may comprise a third cylindrical protrusion 253; and a fourth recessed region 211 may comprise a fourth cylindrical protrusion 254.

Each of the first barbed member 240 and the second barbed member 250 may, in various embodiments, comprise at least two frustoconical protrusions 206.

As noted previously, the first curved concave edge 212, second curved concave edge 213, the third curved concave edge 214, and the fourth curved concave edge 215 together with the recessed regions 208, 209, 210, 211 and cylindrical protrusions 251, 252, 253, 254 provide an ergonomic interface that allow for easy gripping of the fitting 200, which is particularly useful during the insertion or withdrawal process of a fitting 200.

As illustrated, the first branch lateral dimension 234 may be precisely perpendicular or generally perpendicular to the first branch transverse dimension 232. In addition, the first branch lateral dimension 234 and the first branch transverse dimension 232 may both be precisely perpendicular or generally perpendicular to a portion of the fluid flow pathway 202 extending through the first fitting branch 220. The second branch lateral dimension 244 may be precisely perpendicular or generally perpendicular to the second branch transverse dimension 242. In addition, the second branch lateral dimension 244 and the second branch transverse dimension 242 may both be precisely perpendicular or generally perpendicular to a portion of the fluid flow pathway 202 extending through the second fitting branch 230.

In addition, the first branch lateral dimension 234 and the second branch lateral dimension 244 may be precisely perpendicular or generally perpendicular. Likewise, the first branch transverse dimension 232 and the second branch transverse dimension 242 may be precisely parallel or generally parallel.

FIGS. 7-9B

The third embodiment of the irrigation fitting 300 comprises two fluid flow pathways, a first fluid flow pathway 302 and a second fluid flow pathway 304. It should be noted that fluid (e.g., water or water including additives, such as fertilizers or pesticides) could flow in either direction through the first fluid flow pathway 302 and the second fluid flow pathway 304. The illustrated first fluid flow pathway 302 is linear, while the second fluid flow pathway 304 is non-linear and has a 90° turn. The third embodiment of the irrigation fitting 300 includes a first fitting branch 320, a second fitting branch 330, and a third fitting branch 360. Each fitting branch 320, 330, 360 includes a lateral dimension 334, 338, 344 and a transverse dimension 332, 336, 342.

The first fitting branch 320 and the second fitting branch 330 define the first fluid flow pathway 302, while the first fitting branch 320 and the third fitting branch 360 define the second fluid flow pathway 304.

The first fluid flow pathway 302 (including the first fitting branch 320 and the second fitting branch 330) will be discussed in connection with FIGS. 8A-8B, while the second fluid flow pathway 304 (including the first fitting branch 320 and the third fitting branch 360) will be discussed in connection with FIGS. 9A-9B.

FIGS. 8A-8B

Referring now to FIGS. 8A-8B, the first fitting branch 320 may comprise a first planar region 370, a second planar region 372, a first recessed region 308, a second recessed region 309, a first barbed member 340, a first branch lateral dimension 334 and a first branch transverse dimension 332. The first planar region 370 may be disposed opposite the second planar region 372 on the first fitting branch 320 along the first branch lateral dimension 334. The first recessed region 308 may be disposed opposite the second recessed region 309 on the first fitting branch 320 along the first branch transverse dimension 332.

The second fitting branch 330 may comprise a third planar region 374, a fourth planar region 376, a third recessed region 310, a fourth recessed region 311, a second barbed member 350, a second branch lateral dimension 338 and a second branch transverse dimension 336. The third planar region 374 may be disposed opposite the fourth planar region 376 on the second fitting branch 330 along the second branch lateral dimension 338. The third recessed region 310 may be disposed opposite the fourth recessed region 311 on the second fitting branch 330 along the second branch transverse dimension 336.

The first planar region 370 and the third planar region 374 jointly comprise a first curved concave edge 312 and a second curved concave edge 313. The first curved concave edge 312 may be disposed opposite the second curved concave edge 313 along both the first branch transverse dimension 332 and the second branch transverse dimension 336. The second planar region 372 and the fourth planar region 376 jointly comprise a third curved concave edge 314 and a fourth curved concave edge 315. The third curved concave edge 314 may be disposed opposite the fourth curved concave edge 315 along both the first branch transverse dimension 332 and the second branch transverse dimension 336.

The first recessed region 308 and the second recessed region 309 may be disposed intermediate the first planar region 370 and the second planar region 372 along the first branch lateral dimension 334. The third recessed region 310 and the fourth recessed region 311 may be disposed intermediate the third planar region 374 and the fourth planar region 376 along the second branch lateral dimension 338.

The second recessed region 309 and the fourth recessed region 311 may be disposed intermediate the second curved concave edge 313 and the fourth curved concave edge 315 along both the first branch lateral dimension 334 and the second branch lateral dimension 338. The first recessed region 308 and the third recessed region 310 may be disposed intermediate the third curved concave edge 314 and the first curved concave edge 312 along both the first branch lateral dimension 334 and the second branch lateral dimension 338.

The first recessed region 308 may comprise a first cylindrical protrusion 351; the second recessed region 309 may comprise a second cylindrical protrusion 352; the third recessed region 310 may comprise a third cylindrical protrusion 353; and a fourth recessed region 311 may comprise a fourth cylindrical protrusion 354.

Each of the first barbed member 340 and the second barbed member 350 may, in various embodiments, comprise at least two frustoconical protrusions 306.

As noted previously, the first curved concave edge 312, the second curved concave edge 313, the third curved concave edge 314, and the fourth curved concave edge 315 together with the recessed regions 308, 309, 310, 311 and cylindrical protrusions 351, 352, 353, 354 provide an ergonomic interface that allow for easy gripping of the fitting 300, which is particularly useful during the insertion or withdrawal process of a fitting 300.

The third embodiment of the irrigation fitting 300 may also comprise a first discontinuous region 371 and a second discontinuous region 373. In the context of the first fluid flow pathway 302, the first discontinuous region 371 is positioned within the third curved concave edge 314, while the second discontinuous region 373 is positioned within the fourth curved concave edge 315.

As illustrated, the first branch lateral dimension 334 may be precisely perpendicular or generally perpendicular to the first branch transverse dimension 332. In addition, the first branch lateral dimension 334 and the first branch transverse dimension 332 may both be precisely perpendicular or generally perpendicular to a portion of the fluid flow pathway 302 extending through the first fitting branch 320. The second branch lateral dimension 338 may be precisely perpendicular or generally perpendicular to the second branch transverse dimension 336. In addition, the second branch lateral dimension 338 and the second branch transverse dimension 336 may both be precisely perpendicular or generally perpendicular to a portion of the fluid flow pathway 302 extending through the second fitting branch 330.

In addition, the first branch lateral dimension 334 and the second branch lateral dimension 338 may be precisely parallel or generally parallel. Likewise, the first branch transverse dimension 332 and the second branch transverse dimension 336 may be precisely parallel or generally parallel.

FIGS. 9A-9B

Figures 9A, 9B:
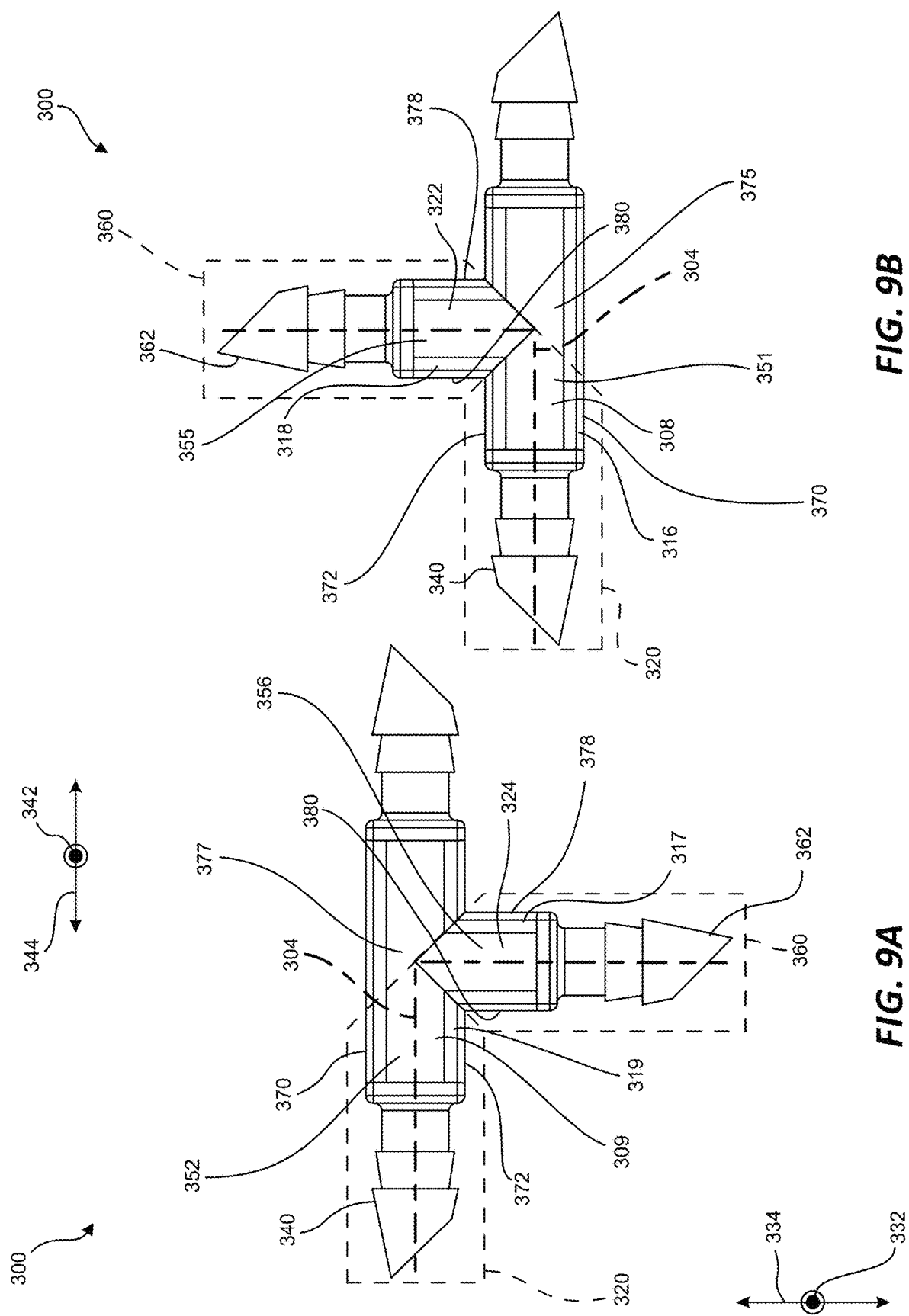
FIG. 9A is a top view of the third embodiment of the irrigation fitting, illustrating a second fluid flow pathway through the third embodiment.
FIG. 9B is a bottom view of the third embodiment of the irrigation fitting, illustrating the second fluid flow pathway through the third embodiment.
Figure 10:
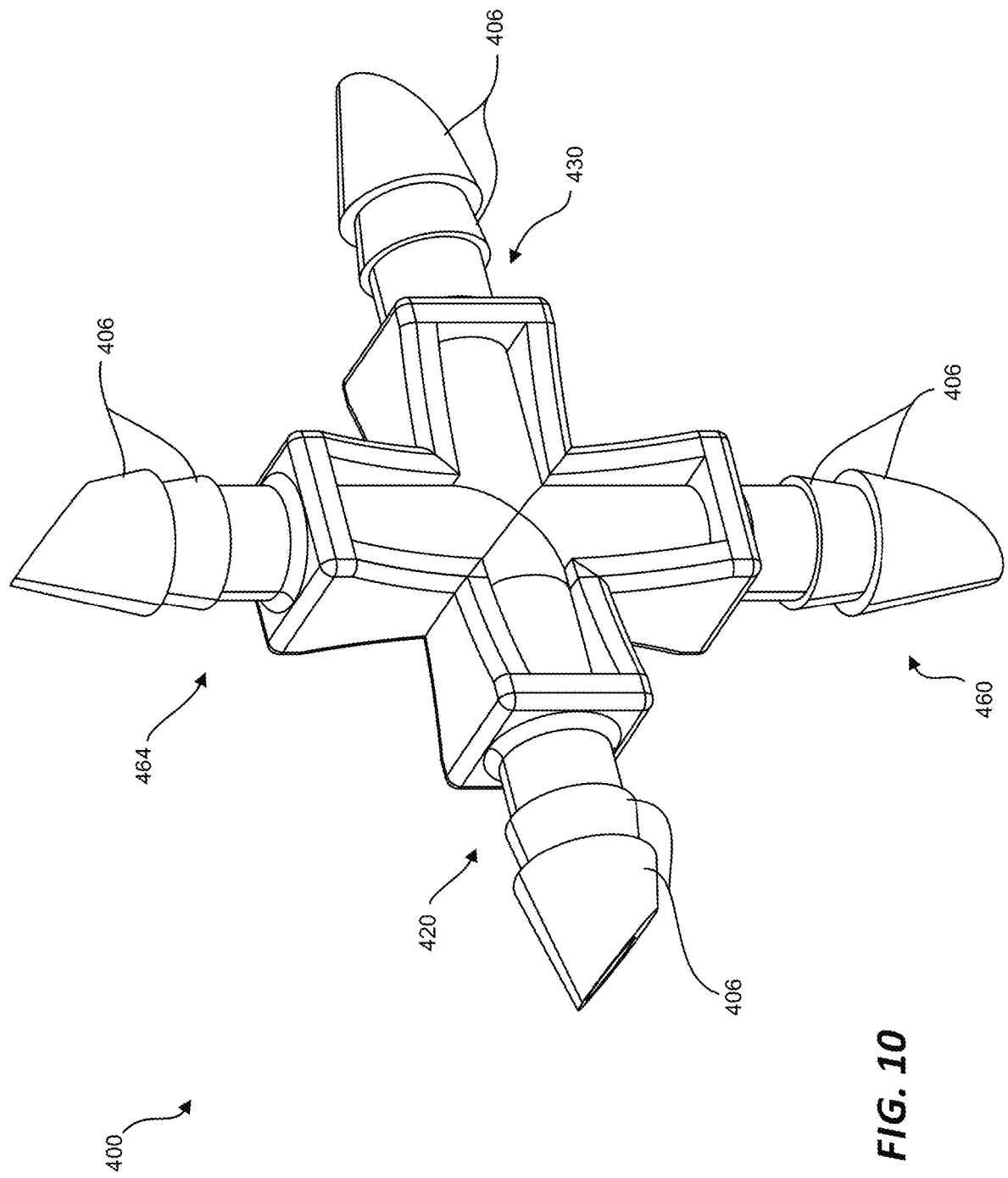
FIG. 10 is a perspective view of a fourth embodiment of the irrigation fitting.
Figure 11B:
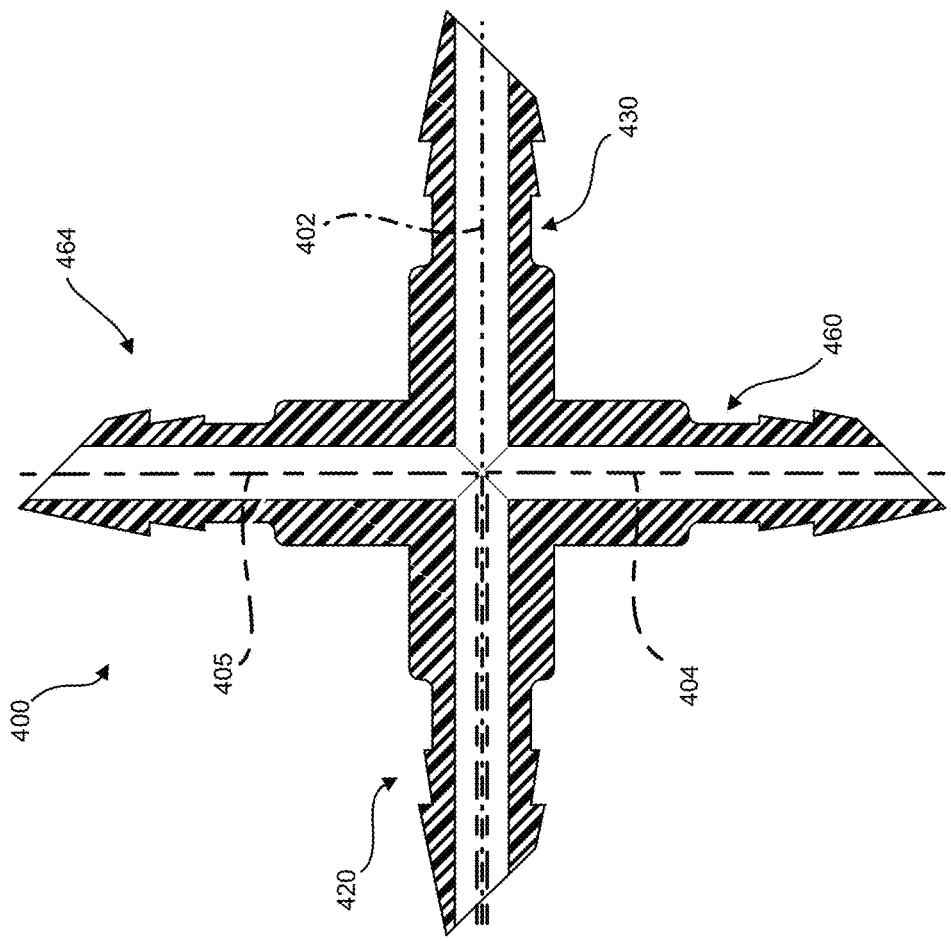
FIG. 11B is a cross-sectional view of the fourth embodiment of the irrigation fitting shown across the line 11B-11B from FIG. 11A.
Figure 11A:
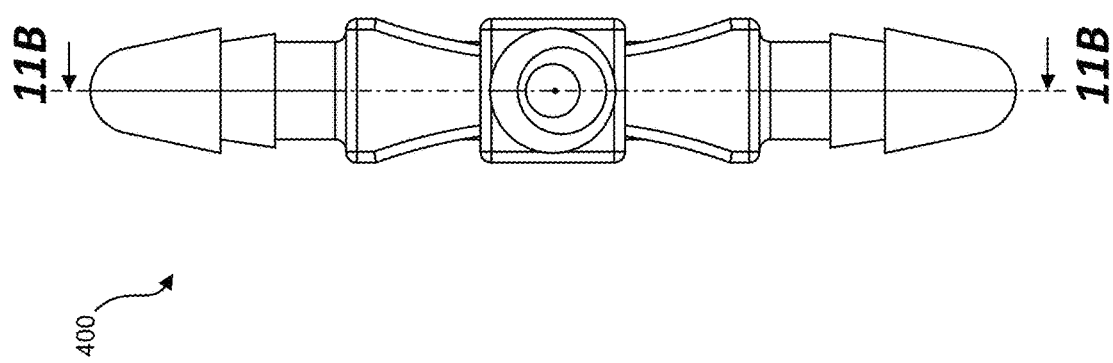
FIG. 11A is a side view of the fourth embodiment of the irrigation fitting.

Referring now to FIGS. 9A-9B, the first fitting branch 320 may comprise a first planar region 370, a second planar region 372, a first recessed region 308, a second recessed region 309, a first barbed member 340, a first branch lateral dimension 334 and a first branch transverse dimension 332. The first planar region 370 may be disposed opposite the second planar region 372 on the first fitting branch 320 along the first branch lateral dimension 334. The first recessed region 308 may be disposed opposite the second recessed region 309 on the first fitting branch 320 along the first branch transverse dimension 332.

The third fitting branch 360 may comprise a fifth planar region 378, a sixth planar region 380, a fifth recessed region 322, a sixth recessed region 324, a third barbed member 362, a third branch lateral dimension 344 and a third branch transverse dimension 342. The fifth planar region 378 may be disposed opposite the sixth planar region 380 on the third fitting branch 360 along the third branch lateral dimension 344. The fifth recessed region 322 may be disposed opposite the sixth recessed region 324 on the third fitting branch 360 along the third branch transverse dimension 342.

The first planar region 370 and the fifth planar region 378 jointly comprise a fifth curved concave edge 316 and a sixth curved concave edge 317. The second planar region 372 and the sixth planar region 380 jointly comprise a seventh curved concave edge 318 and an eighth curved concave edge 319.

The first recessed region 308 and the second recessed region 309 may be disposed intermediate the first planar region 370 and the second planar region 372 along the first branch lateral dimension 334. The fifth recessed region 322 and the sixth recessed region 324 may be disposed intermediate the fifth planar region 378 and the sixth planar region 380 along the third branch lateral dimension 344.

The second recessed region 309 and the sixth recessed region 324 may be disposed intermediate the sixth curved concave edge 317 and the eighth curved concave edge 319, from the perspective of the top view as illustrated in FIG. 9A. The first recessed region 308 and the fifth recessed region 322 may be disposed intermediate the seventh curved concave edge 318 and the fifth curved concave edge 316, from the perspective of the bottom view as illustrated in FIG. 9B.

The first recessed region 308 may comprise a first cylindrical protrusion 351; the second recessed region 309 may comprise a second cylindrical protrusion 352; the fifth recessed region 322 may comprise a fifth cylindrical protrusion 355; and a sixth recessed region 324 may comprise a sixth cylindrical protrusion 356.

Each of the first barbed member 340 and the third barbed member 362, in various embodiments, may comprise at least two frustoconical protrusions 306.

As noted previously, the fifth curved concave edge 316, the sixth curved concave edge 317, the seventh curved concave edge 318, and the eighth curved concave edge 319 together with the recessed regions 308, 309, 322, 324 and cylindrical protrusions 351, 352, 355, 356 provide an ergonomic interface that allow for easy gripping of the fitting 300, which is particularly useful during the insertion or withdrawal process of a fitting 300.

The third embodiment of the irrigation fitting 300 may also comprise a third discontinuous region 375 and a fourth discontinuous region 377. In the context of the second fluid flow pathway 304, the third discontinuous region 375 is positioned within the fifth curved concave edge 316, while the fourth discontinuous region 377 is positioned within the sixth curved concave edge 317.

As illustrated, the first branch lateral dimension 334 may be precisely perpendicular or generally perpendicular to the first branch transverse dimension 332. In addition, the first branch lateral dimension 334 and the first branch transverse dimension 332 may both be precisely perpendicular or generally perpendicular to a portion of the fluid flow pathway 304 extending through the first fitting branch 320. The third branch lateral dimension 344 may be precisely perpendicular or generally perpendicular to the third branch transverse dimension 342. In addition, the third branch lateral dimension 344 and the third branch transverse dimension 342 may both be precisely perpendicular or generally perpendicular to a portion of the fluid flow pathway 304 extending through the third fitting branch 360.

In addition, the first branch lateral dimension 334 and the second branch lateral dimension 344 may be precisely perpendicular or generally perpendicular. Likewise, the first branch transverse dimension 332 and the second branch transverse dimension 342 may be precisely parallel or generally parallel.

FIGS. 10-14B

The fourth embodiment of the irrigation fitting 400 comprises three fluid flow pathways: a first fluid flow pathway 402, a second fluid flow pathway 404, and a third fluid flow pathway 405. It should be noted that fluid (e.g., water or water including additives, such as fertilizers or pesticides) could flow in either direction through the first fluid flow pathway 402, the second fluid flow pathway 404, and the third fluid flow pathway 405. The illustrated first fluid flow pathway 402 is linear, while the second fluid flow pathway 404 and the third fluid flow pathway 405 are non-linear and include 90° turns. The fourth embodiment of the irrigation fitting 400 includes a first fitting branch 420, a second fitting branch 430, a third fitting branch 460, and a fourth fitting branch 464. Each fitting branch 420, 430, 460, 464 includes a lateral dimension 434, 438, 444, 448 and a transverse dimension 432, 436, 442, 446.

The first fitting branch 420 and the second fitting branch 430 define the first fluid flow pathway 402; the first fitting branch 420 and the third fitting branch 460 define the second fluid flow pathway 404; the first fitting branch 420 and the fourth fitting branch 464 define the third fluid flow pathway 405.

The first fluid flow pathway 402 (including the first fitting branch 420 and the second fitting branch 430) will be discussed in connection with FIGS. 12A-12B; the second fluid flow pathway 404 (including the first fitting branch 420 and the third fitting branch 460) will be discussed in connection with FIGS. 13A-13B; and the third fluid flow pathway 405 (including the first fitting branch 420 and the fourth fitting branch 464) will be discussed in connection with FIGS. 14A-14B.

FIGS. 12A-12B

Figures 12A, 12B:
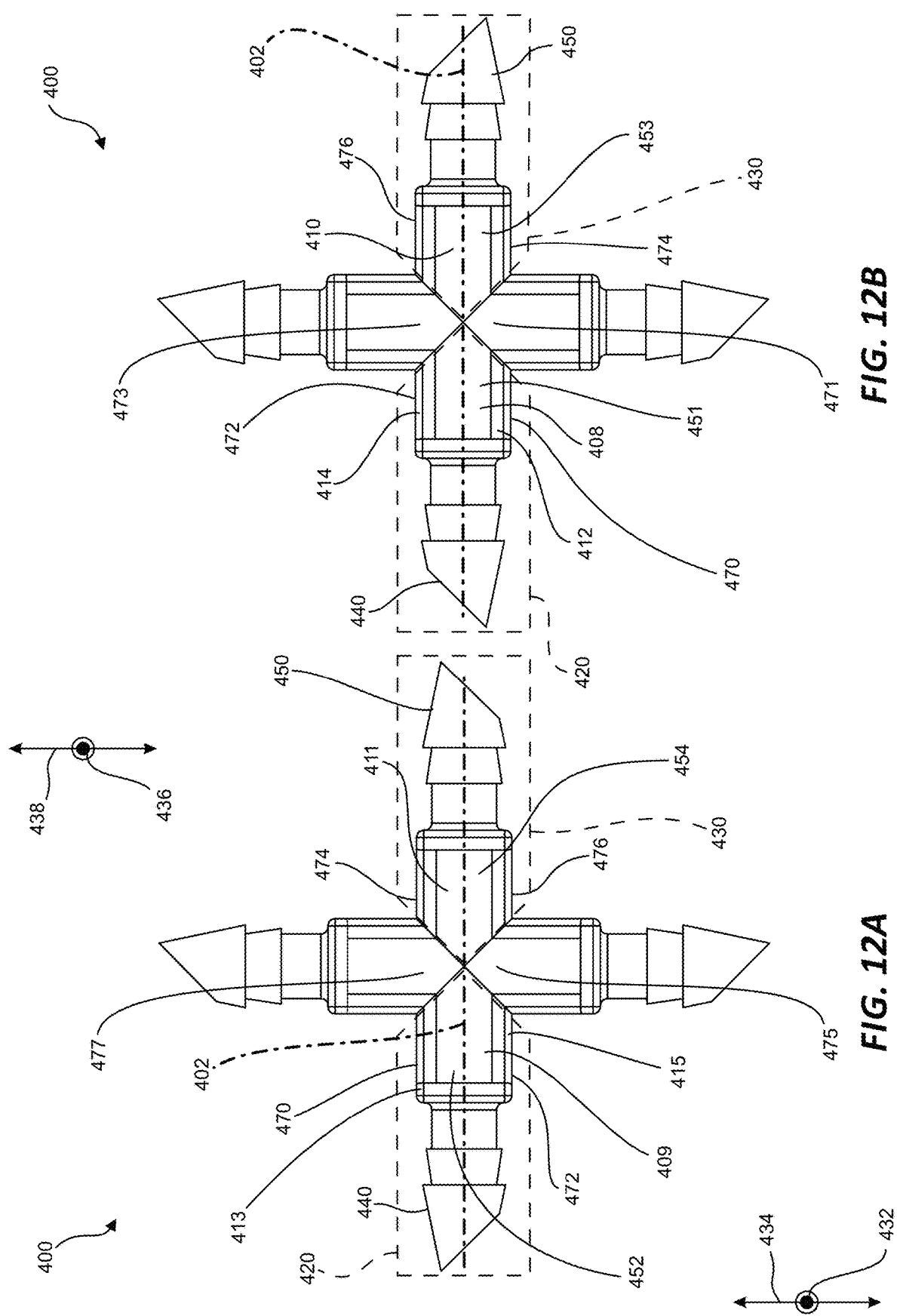
FIG. 12A is a top view of the fourth embodiment of the irrigation fitting, illustrating a first fluid flow pathway through the fourth embodiment.
FIG. 12B is a bottom view of the fourth embodiment of the irrigation fitting, illustrating the first fluid flow pathway through the fourth embodiment.

Referring now to FIGS. 12A-12B, the first fitting branch 420 may comprise a first planar region 470, a second planar region 472, a first recessed region 408, a second recessed region 409, a first barbed member 440, a first branch lateral dimension 434 and a first branch transverse dimension 432. The first planar region 470 may be disposed opposite the second planar region 472 on the first fitting branch 420 along the first branch lateral dimension 434. The first recessed region 408 may be disposed opposite the second recessed region 409 on the first fitting branch 420 along the first branch transverse dimension 432.

The second fitting branch 430 may comprise a third planar region 474, a fourth planar region 476, a third recessed region 410, a fourth recessed region 411, a second barbed member 450, a second branch lateral dimension 438 and a second branch transverse dimension 436. The third planar region 474 may be disposed opposite the fourth planar region 476 on the second fitting branch 430 along the second branch lateral dimension 438. The third recessed region 410 may be disposed opposite the fourth recessed region 411 on the second fitting branch 430 along the second branch transverse dimension 436.

The first planar region 470 and the third planar region 474 jointly comprise a first curved concave edge 412 and a second curved concave edge 413. The first curved concave edge 412 may be disposed opposite the second curved concave edge 413 along both the first branch transverse dimension 432 and the second branch transverse dimension 436. The second planar region 472 and the fourth planar region 476 jointly comprise a third curved concave edge 414 and a fourth curved concave edge 415. The third curved concave edge 414 may be disposed opposite the fourth curved concave edge 415 along both the first branch transverse dimension 432 and the second branch transverse dimension 436.

The first recessed region 408 and the second recessed region 409 may be disposed intermediate the first planar region 470 and the second planar region 472 along the first branch lateral dimension 434. The third recessed region 410 and the fourth recessed region 411 may be disposed intermediate the third planar region 474 and the fourth planar region 476 along the second branch lateral dimension 438.

The second recessed region 409 and the fourth recessed region 411 may be disposed intermediate the second curved concave edge 413 and the fourth curved concave edge 415 along both the first branch lateral dimension 434 and the second branch lateral dimension 438. The first recessed region 408 and the third recessed region 410 may be disposed intermediate the third curved concave edge 414 and the first curved concave edge 412 along both the first branch lateral dimension 434 and the second branch lateral dimension 438.

The first recessed region 408 may comprise a first cylindrical protrusion 451; the second recessed region 409 may comprise a second cylindrical protrusion 452; the third recessed region 410 may comprise a third cylindrical protrusion 453; and a fourth recessed region 411 may comprise a fourth cylindrical protrusion 454.

Each of the first barbed member 440 and the second barbed member 450 may, in various embodiments, comprise at least two frustoconical protrusions 406.

As noted previously, the first curved concave edge 412, the second curved concave edge 413, the third curved concave edge 414, and the fourth curved concave edge 415 together with the recessed regions 408, 409, 410, 411 and cylindrical protrusions 451, 452, 453, 454 provide an ergonomic interface that allow for easy gripping of the fitting 400, which is particularly useful during the insertion or withdrawal process of a fitting 400.

The fourth embodiment of the irrigation fitting 400 may also comprise a first discontinuous region 471, a second discontinuous region 473, a third discontinuous region 475, and a fourth discontinuous region 477. In the context of the first fluid flow pathway 402, the first discontinuous region 471 is positioned within the first curved concave edge 412, the second discontinuous region 473 is positioned within the third curved concave edge 414, the third discontinuous region 475 is positioned within the fourth curved concave edge 415, and the fourth discontinuous region 477 is positioned within the second curved concave edge 413.

As illustrated, the first branch lateral dimension 434 may be precisely perpendicular or generally perpendicular to the first branch transverse dimension 432. In addition, the first branch lateral dimension 434 and the first branch transverse dimension 432 may both be precisely perpendicular or generally perpendicular to a portion of the fluid flow pathway 402 extending through the first fitting branch 420. The second branch lateral dimension 438 may be precisely perpendicular or generally perpendicular to the second branch transverse dimension 436. In addition, the second branch lateral dimension 438 and the second branch transverse dimension 436 may both be precisely perpendicular or generally perpendicular to a portion of the fluid flow pathway 402 extending through the second fitting branch 430.

In addition, the first branch lateral dimension 434 and the second branch lateral dimension 438 may be precisely parallel or generally parallel. Likewise, the first branch transverse dimension 432 and the second branch transverse dimension 436 may be precisely parallel or generally parallel.

FIGS. 13A-13B

Figures 13A, 13B:
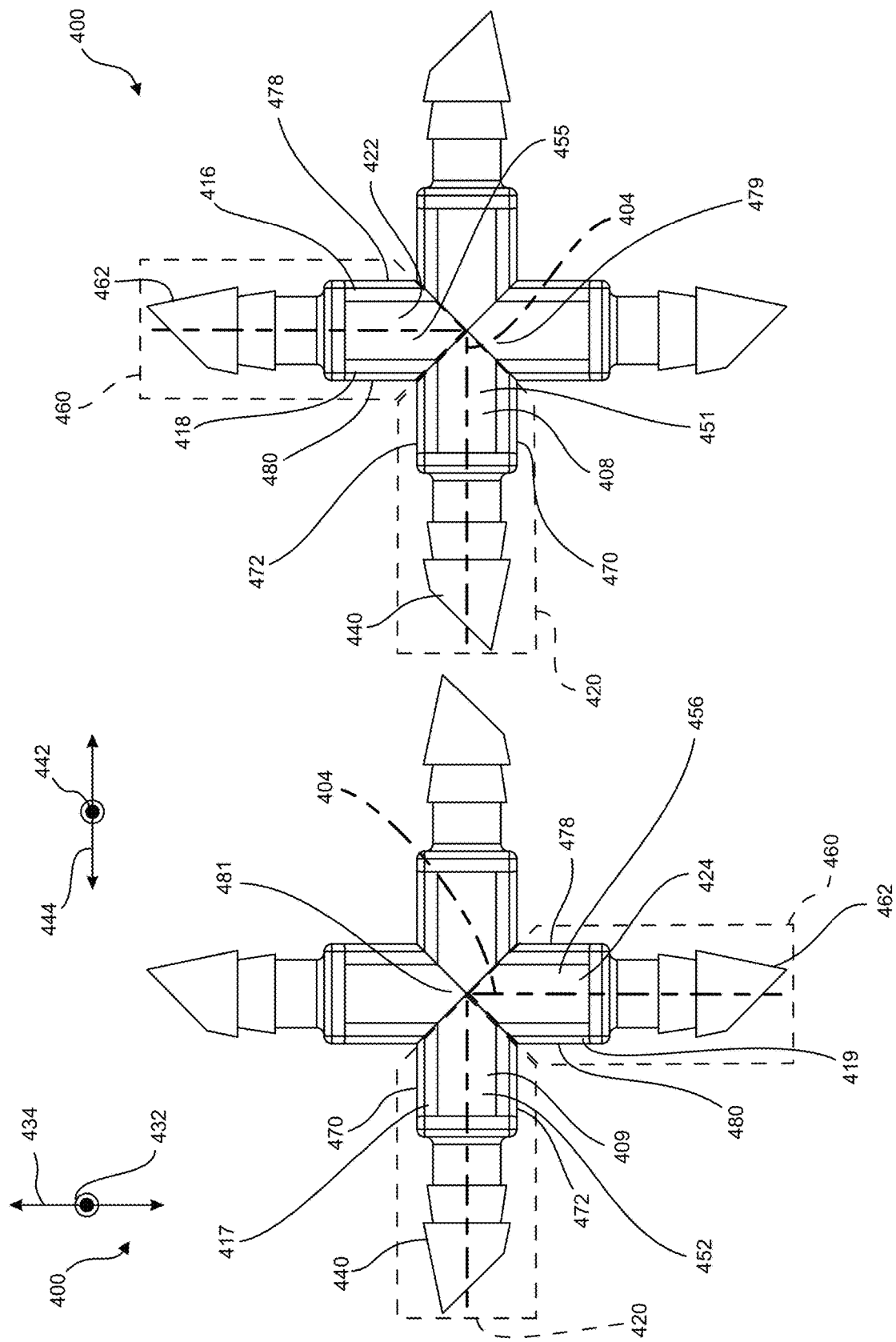
FIG. 13A is a top view of the fourth embodiment of the irrigation fitting, illustrating a second fluid flow pathway through the fourth embodiment.
FIG. 13B is a bottom view of the fourth embodiment of the irrigation fitting, illustrating the second fluid flow pathway through the fourth embodiment.

Referring now to FIGS. 13A-13B, the first fitting branch 420 may comprise a first planar region 470, a second planar region 472, a first recessed region 408, a second recessed region 409, a first barbed member 440, a first branch lateral dimension 434 and a first branch transverse dimension 432. The first planar region 470 may be disposed opposite the second planar region 472 on the first fitting branch 420 along the first branch lateral dimension 434. The first recessed region 408 may be disposed opposite the second recessed region 409 on the first fitting branch 420 along the first branch transverse dimension 432.

The third fitting branch 460 may comprise a fifth planar region 478, a sixth planar region 480, a fifth recessed region 422, a sixth recessed region 424, a third barbed member 462, a third branch lateral dimension 444 and a third branch transverse dimension 442. The fifth planar region 478 may be disposed opposite the sixth planar region 480 on the third fitting branch 460 along the third branch lateral dimension 444. The fifth recessed region 422 may be disposed opposite the sixth recessed region 424 on the third fitting branch 460 along the third branch transverse dimension 442.

The first planar region 470 and the fifth planar region 478 jointly comprise a fifth curved concave edge 416 and a sixth curved concave edge 417. The second planar region 472 and the sixth planar region 480 jointly comprise a seventh curved concave edge 418 and an eighth curved concave edge 419.

The first recessed region 408 and the second recessed region 409 may be disposed intermediate the first planar region 470 and the second planar region 472 along the first branch lateral dimension 434. The fifth recessed region 422 and the sixth recessed region 424 may be disposed intermediate the fifth planar region 478 and the sixth planar region 480 along the third branch lateral dimension 444.

The second recessed region 409 and the sixth recessed region 424 may be disposed intermediate the sixth curved concave edge 417 and the eighth curved concave edge 419, from the perspective of the top view as illustrated in FIG. 13A. The first recessed region 408 and the fifth recessed region 422 may be disposed intermediate the seventh curved concave edge 418 and the fifth curved concave edge 416, from the perspective of the bottom view as illustrated in FIG. 13B.

The first recessed region 408 may comprise a first cylindrical protrusion 451; the second recessed region 409 may comprise a second cylindrical protrusion 452; the fifth recessed region 422 may comprise a fifth cylindrical protrusion 455; and a sixth recessed region 424 may comprise a sixth cylindrical protrusion 456.

Each of the first barbed member 440 and the third barbed member 462 may, in various embodiments, comprise at least two frustoconical protrusions 406.

As noted previously, the fifth curved concave edge 416, the sixth curved concave edge 417, the seventh curved concave edge 418, and the eighth curved concave edge 419 together with the recessed regions 408, 409, 422, 424 and cylindrical protrusions 451, 452, 455, 456 provide an ergonomic interface that allow for easy gripping of the fitting 400, which is particularly useful during the insertion or withdrawal process of a fitting 400.

The fourth embodiment of the irrigation fitting 400 may also comprise a fifth discontinuous region 479 and a sixth discontinuous region 481. In the context of the second fluid flow pathway 404, the fifth discontinuous region 479 is positioned within the fifth curved concave edge 416, while the sixth discontinuous region 481 is positioned within the sixth curved concave edge 417.

As illustrated, the first branch lateral dimension 434 may be precisely perpendicular or generally perpendicular to the first branch transverse dimension 432. In addition, the first branch lateral dimension 434 and the first branch transverse dimension 432 may both be precisely perpendicular or generally perpendicular to a portion of the fluid flow pathway 404 extending through the first fitting branch 420. The third branch lateral dimension 444 may be precisely perpendicular or generally perpendicular to the third branch transverse dimension 442. In addition, the third branch lateral dimension 444 and the third branch transverse dimension 442 may both be precisely perpendicular or generally perpendicular to a portion of the fluid flow pathway 404 extending through the third fitting branch 460.

In addition, the first branch lateral dimension 434 and the third branch lateral dimension 444 may be precisely perpendicular or generally perpendicular. Likewise, the first branch transverse dimension 432 and the third branch transverse dimension 442 may be precisely parallel or generally parallel.

FIGS. 14A-14B

Referring now to FIGS. 14A-14B, the first fitting branch 420 may comprise a first planar region 470, a second planar region 472, a first recessed region 408, a second recessed region 409, a first barbed member 440, a first branch lateral dimension 434 and a first branch transverse dimension 432. The first planar region 470 may be disposed opposite the second planar region 472 on the first fitting branch 420 along the first branch lateral dimension 434. The first recessed region 408 may be disposed opposite the second recessed region 409 on the first fitting branch 420 along the first branch transverse dimension 432.

The fourth fitting branch 464 may comprise a seventh planar region 482, an eighth planar region 484, a seventh recessed region 426, an eighth recessed region 428, a fourth barbed member 466, a fourth branch lateral dimension 448 and a fourth branch transverse dimension 446. The seventh planar region 482 may be disposed opposite the eighth planar region 484 on the fourth fitting branch 464 along the fourth branch lateral dimension 448. The seventh recessed region 426 may be disposed opposite the eighth recessed region 428 on the fourth fitting branch 464 along the fourth branch transverse dimension 446.

The first planar region 470 and the seventh planar region 482 jointly comprise a ninth curved concave edge 494 and a tenth curved concave edge 495. The second planar region 472 and the eighth planar region 484 jointly comprise an eleventh curved concave edge 496 and a twelfth curved concave edge 497.

The first recessed region 408 and the second recessed region 409 may be disposed intermediate the first planar region 470 and the second planar region 472 along the first branch lateral dimension 434. The seventh recessed region 426 and the eighth recessed region 428 may be disposed intermediate the seventh planar region 482 and the eighth planar region 484 along the fourth branch lateral dimension 448.

The second recessed region 409 and the eighth recessed region 428 may be disposed intermediate the tenth curved concave edge 495 and the twelfth curved concave edge 497, from the perspective of the top view as illustrated in FIG. 14A. The first recessed region 408 and the seventh recessed region 426 may be disposed intermediate the eleventh curved concave edge 496 and the ninth curved concave edge 494, from the perspective of the bottom view as illustrated in FIG. 14B.

The first recessed region 408 may comprise a first cylindrical protrusion 451; the second recessed region 409 may comprise a second cylindrical protrusion 452; the seventh recessed region 426 may comprise a seventh cylindrical protrusion 457; and an eighth recessed region 428 may comprise an eighth cylindrical protrusion 458.

Each of the first barbed member 440 and the fourth barbed member 466 may, in various embodiments, comprise at least two frustoconical protrusions 406.

As noted previously, the ninth curved concave edge 494, the tenth curved concave edge 495, the eleventh curved concave edge 496, and the twelfth curved concave edge 497 together with the recessed regions 408, 409, 426, 428 and cylindrical protrusions 451, 452, 457, 458 provide an ergonomic interface that allow for easy gripping of the fitting 400, which is particularly useful during the insertion or withdrawal process of a fitting 400.

The fourth embodiment of the irrigation fitting 400 may also comprise a seventh discontinuous region 483 and an eighth discontinuous region 485. In the context of the third fluid flow pathway 405, the seventh discontinuous region 483 is positioned within the eleventh curved concave edge 496, while the eighth discontinuous region 485 is positioned within the Twelfth curved concave edge 497.

As illustrated, the first branch lateral dimension 434 may be precisely perpendicular or generally perpendicular to the first branch transverse dimension 432. In addition, the first branch lateral dimension 434 and the first branch transverse dimension 432 may both be precisely perpendicular or generally perpendicular to a portion of the fluid flow pathway 405 extending through the first fitting branch 420. The fourth branch lateral dimension 448 may be precisely perpendicular or generally perpendicular to the fourth branch transverse dimension 446. In addition, the fourth branch lateral dimension 448 and the fourth branch transverse dimension 446 may both be precisely perpendicular or generally perpendicular to a portion of the fluid flow pathway 405 extending through the fourth fitting branch 464.

In addition, the first branch lateral dimension 434 and the fourth branch lateral dimension 448 may be precisely perpendicular or generally perpendicular. Likewise, the first branch transverse dimension 432 and the fourth branch transverse dimension 446 may be precisely parallel or generally parallel.

Conclusion

The illustrated fluid flow pathways 102, 202, 302, 304, 402, 404, 405 in the fittings 100, 200, 300, 400 are either linear or involve a 90° turn. In alternative embodiments, fittings 100, 200, 300, 400 within the scope of the disclosed subject matter could include fluid flow pathways 102, 202, 302, 304, 402, 404, 405 with different types of turns or bends, such as 30° turns or 60° turns. The disclosed fittings 100, 200, 300, 400 may be drip irrigation fittings 100, 200, 300, 400 for use with a drip irrigation system.

In various embodiments, as illustrated in the figures, within a pertinent fitting branch, the transverse dimension may be generally perpendicular to the lateral dimension. In addition, as further illustrated in the figures, again within a pertinent fitting branch, the lateral dimension and transverse dimension are both generally perpendicular to a portion of a fluid flow pathway through the pertinent fitting branch.

While specific embodiments and applications of the present invention have been illustrated and described, it is to be understood that the invention is not limited to the precise configuration and components disclosed herein. Various modifications, changes, and variations, which will be apparent to those skilled in the art, may be made in the arrangement, operation, and details of the components, methods and systems of the present invention disclosed herein without departing from the spirit and scope of the invention.

The invention claimed is:

1. An irrigation fitting comprising:
a first fitting branch comprising a first planar region, a second planar region, a first recessed region, a second recessed region, a first barbed member, a first branch lateral dimension and a first branch transverse dimension, the first planar region being disposed opposite the second planar region on the first fitting branch along the first branch lateral dimension, and the first recessed region being disposed opposite the second recessed region on the first fitting branch along the first branch transverse dimension;
a second fitting branch comprising a third planar region, a fourth planar region, a third recessed region, a fourth recessed region, a second barbed member, a second branch lateral dimension and a second branch transverse dimension, the third planar region being disposed opposite the fourth planar region on the second fitting branch along the second branch lateral dimension, the third recessed region being disposed opposite the fourth recessed region on the second fitting branch along the second branch transverse dimension,
wherein the first planar region and the third planar region jointly comprise a first curved concave edge and a second curved concave edge,
wherein the second planar region and the fourth planar region jointly comprise a third curved concave edge and a fourth curved concave edge,
wherein the first curved concave edge and the second curved concave edge jointly narrow the first planar region along the first branch transverse dimension,
wherein the third curved concave edge and the fourth curved concave edge jointly narrow the second planar region along the second branch transverse dimension, and
wherein each of the first recessed region, the second recessed region, the third recessed region and the fourth recessed region comprises a cylindrical protrusion that extends substantially parallel to a respective fluid flow pathway of each fitting branch.

2. The irrigation fitting of claim 1, wherein the first fitting branch and the second fitting branch define a linear fluid flow pathway.

3. The irrigation fitting of claim 1, wherein the first fitting branch and the second fitting branch define a non-linear fluid flow pathway.

4. The irrigation fitting of claim 1, wherein the first branch lateral dimension is generally perpendicular to the first branch transverse dimension.

5. The irrigation fitting of claim 4, wherein the first branch lateral dimension and the first branch transverse dimension are both generally perpendicular to a portion of the fluid flow pathway through the first fitting branch.

6. The irrigation fitting of claim 5, wherein the second branch lateral dimension is generally perpendicular to the second branch transverse dimension.

7. The irrigation fitting of claim 6, wherein the second branch lateral dimension and the second branch transverse dimension are both generally perpendicular to a portion of the fluid flow pathway through the second fitting branch.

8. The irrigation fitting of claim 7, wherein each of the first barbed member and the second barbed member comprise at least two frustoconical protrusions.

9. The irrigation fitting of claim 7, wherein at least one of the first curved concave edge, the second curved concave edge, the third curved concave edge and the fourth curved concave edge comprises a discontinuous region.

10. The irrigation fitting of claim 7, further comprising a third fitting branch comprising a fifth planar region, a sixth planar region, a fifth recessed region, a sixth recessed region, a third barbed member, a third branch lateral dimension and a third branch transverse dimension, the fifth planar region being disposed opposite the sixth planar region on the third fitting branch along the third branch lateral dimension, and the fifth recessed region being disposed opposite the sixth recessed region on the third fitting branch along the third branch transverse dimension,
    wherein the first planar region and the fifth planar region jointly comprise a fifth curved concave edge and a sixth curved concave edge, and
    wherein the second planar region and the sixth planar region jointly comprise a seventh curved concave edge and an eighth curved concave edge.

11. The irrigation fitting of claim 10, further comprising a fourth fitting branch comprising a seventh planar region, an eighth planar region, a seventh recessed region, an eighth recessed region, a fourth barbed member, a fourth branch lateral dimension and a fourth branch transverse dimension, the seventh planar region being disposed opposite the eighth planar region on the fourth fitting branch along the fourth branch lateral dimension, the seventh recessed region being disposed opposite the eighth recessed region on the fourth fitting branch along the fourth branch transverse dimension,
    wherein the first planar region and the seventh planar region jointly comprise a ninth curved concave edge and a tenth curved concave edge, and
    wherein the second planar region and the eighth planar region jointly comprise an eleventh curved concave edge and a twelfth curved concave edge.

12. The irrigation fitting of claim 11, wherein each of the fifth recessed region, the sixth recessed region, the seventh recessed region, and the eighth recessed region comprise a cylindrical protrusion.

13. The irrigation fitting of claim 12, wherein each of the third barbed member and the fourth barbed member comprise at least two frustoconical protrusions.

14. The irrigation fitting of claim 13, wherein at least one of the fifth curved concave edge, the sixth curved concave edge, the tenth curved concave edge and the twelfth curved concave edge comprises a discontinuous region.

* * * * *